US006525855B1

(12) United States Patent
Westbrook et al.

(10) Patent No.: US 6,525,855 B1
(45) Date of Patent: Feb. 25, 2003

(54) TELECOMMUNICATIONS SYSTEM SIMULTANEOUSLY RECEIVING AND MODULATING AN OPTICAL SIGNAL

(75) Inventors: Leslie D Westbrook, Cheltenham (GB); David G Moodie, Ipswich (GB)

(73) Assignee: British Telecommunications public limited company, London (GB)

( * ) Notice: Subject to any disclaimer, the term of this patent is extended or adjusted under 35 U.S.C. 154(b) by 0 days.

(21) Appl. No.: 09/051,147

(22) PCT Filed: Jul. 21, 1997

(86) PCT No.: PCT/GB97/01958
§ 371 (c)(1),
(2), (4) Date: Apr. 2, 1998

(87) PCT Pub. No.: WO98/04057
PCT Pub. Date: Jan. 29, 1998

(30) Foreign Application Priority Data

| Jul. 19, 1996 | (EP) | 96305315 |
|---|---|---|
| Nov. 29, 1996 | (GB) | 9624909 |
| May 20, 1997 | (GB) | 9710394 |

(51) Int. Cl.[7] .............................................. H04B 10/00
(52) U.S. Cl. ...................... 359/145; 359/188; 359/143; 359/132; 359/110; 359/179; 359/193
(58) Field of Search ................................ 359/188, 145, 359/143, 152, 132, 110, 176, 174, 179, 193

(56) References Cited

U.S. PATENT DOCUMENTS 3,976,873 A   8/1976 Bottka et al.
5,251,053 A * 10/1993 Heidemann .................. 359/145
5,379,309 A *  1/1995 Logan, Jr. ..................... 372/18
5,657,374 A *  8/1997 Russell et al. ............... 370/328
5,710,651 A *  1/1998 Logan, Jr. .................... 359/145
5,777,771 A *  7/1998 Smith .......................... 359/180
5,798,856 A *  8/1998 Suzuki et al. ............... 359/181
5,917,636 A *  6/1999 Wake et al. ................. 359/180
5,949,564 A *  9/1999 Wake .......................... 359/150
5,969,837 A * 10/1999 Farber et al. ................ 359/132
5,987,303 A * 11/1999 Dutta et al. .................. 455/3.1

FOREIGN PATENT DOCUMENTS

| EP | 0143000 B1 | 5/1985 |
| EP | 0414333 A2 | 8/1990 |
| EP | 0416879 B1 | 12/1995 |
| EP | 0714218 A1 | 5/1996 |
| WO | WO 95/27346 | 10/1995 |

OTHER PUBLICATIONS

Moodie et al, "Discrete Electroabsorption Modulators with Enhanced Modulation Depth", Journal of Lightwave Technology, vol. 14, No. 9, Sep. 1996.

Bidirectional Fibre–Optical Transmission Using a Multiple Quantum–Well (MQW) Modulator/Detector, Electronics Letters May 8, 1986, vol. 22, No. 10, pp. 528–529.

Frigo et al, "A Wavelength–Division Multiplexed Passive Optical Network with Cost–Shared Components", IEEE Photonics Technology Letters, vol. 6, No. 11, Nov. 1994.

(List continued on next page.)

Primary Examiner—Leslie Pascal
Assistant Examiner—Hahn Phan
(74) Attorney, Agent, or Firm—Nixon & Vanderhye P.C.

(57) ABSTRACT

An optical communications network includes a terminal which can simultaneously receive and modulate an optical signal. The terminal includes an optical modulator which is controlled by varying the bias voltage applied to it.

24 Claims, 16 Drawing Sheets

OTHER PUBLICATIONS

Westbrook et al, "Simultaneous bi-directional Analogue Fibre-Optic Transmission Using an Electroabsorption Modulator", Electronics Letters, Sep. 12, 1996, vol. 32, No. 19, pp. 1806–1807.

VanBlaricum, "Photonic Systems for Antenna Applications", IEEE Antennas and Propagation Magazine, vol. 36, No. 5, Oct. 1994.

Sun et al,, "High Spurious Free Dynamic Range Fibre Link Using a Semiconductor Electroabsorption Modulator", Electronics Letters, $25^{th}$ May 1995, vol. 31, No. 11.

Moodie et al, "Generation of 6.3 ps Optical Pulses at a 10 GHz Repetition Rate Using a Packaged Electroabsorption Modulator and Dispersion Compensating Fibre", Electronics Letters, vol. 30, No. 30, Sep. 29, 1994.

Welstand et al, "Dual-Function Electroabsorption Waveguide Modulator/Detector for Optoelectronic Transceiver Applications", IEEE Photonics Technology Letters, vol. 8, No. 11, Nov. 1996.

Suzuki et al, "New Applications of a Sinusoidally Driven InGaAsP Electroabsorption Modulator to IN-Line Optical Gates with ASE Noise Reduction Effect", Journal of Lightwave Technology, 10 (1992) Dec., No. 12, New York, US.

Westbrook et al "Full-Duplex, 25 km Analogue Fibre Transmission at 120Mbit/s with Simultaneous Modulation and Detection in an Electroabsorption Modulator", Electronics Letters, $10^{th}$ Apr. 1997, vol. 33, No. 8.

Noel et al, "120 Mbit/S QPSK Data and Multi-Channel TV Transmission Over 13 km Fibre to a 60GHz Mobile Radio Link Using an Electroabsorption Modulator as a Transceiver", Electronics Letters, $17^{th}$ Jul. 1997, vol. 33, No. 15, pp. 1285–1286.

* cited by examiner

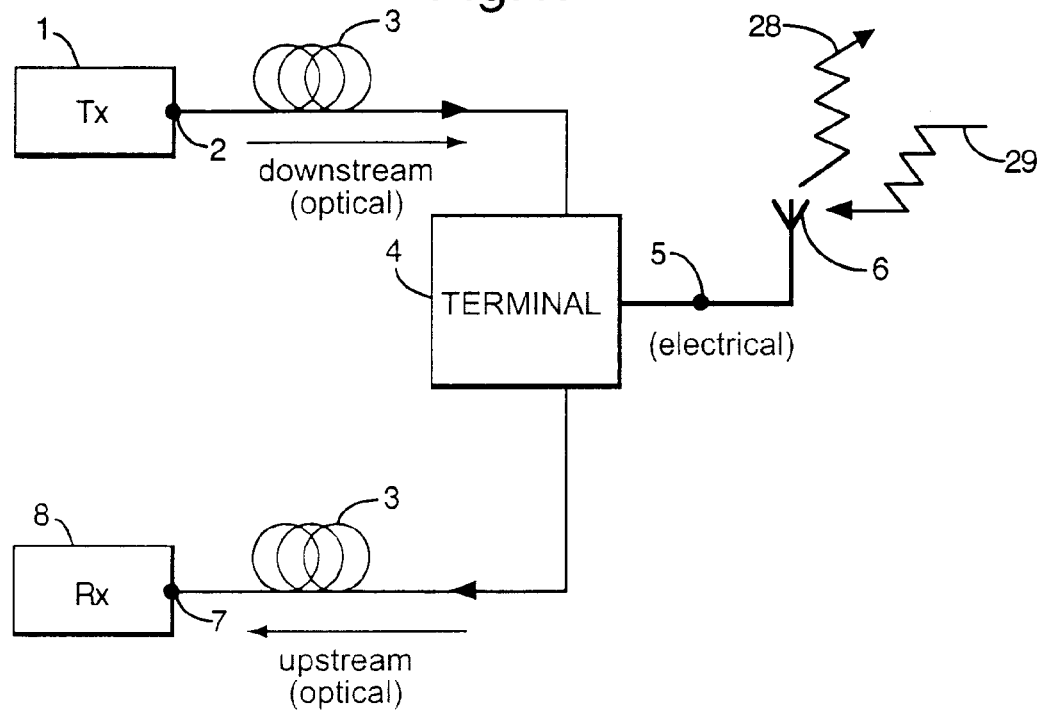
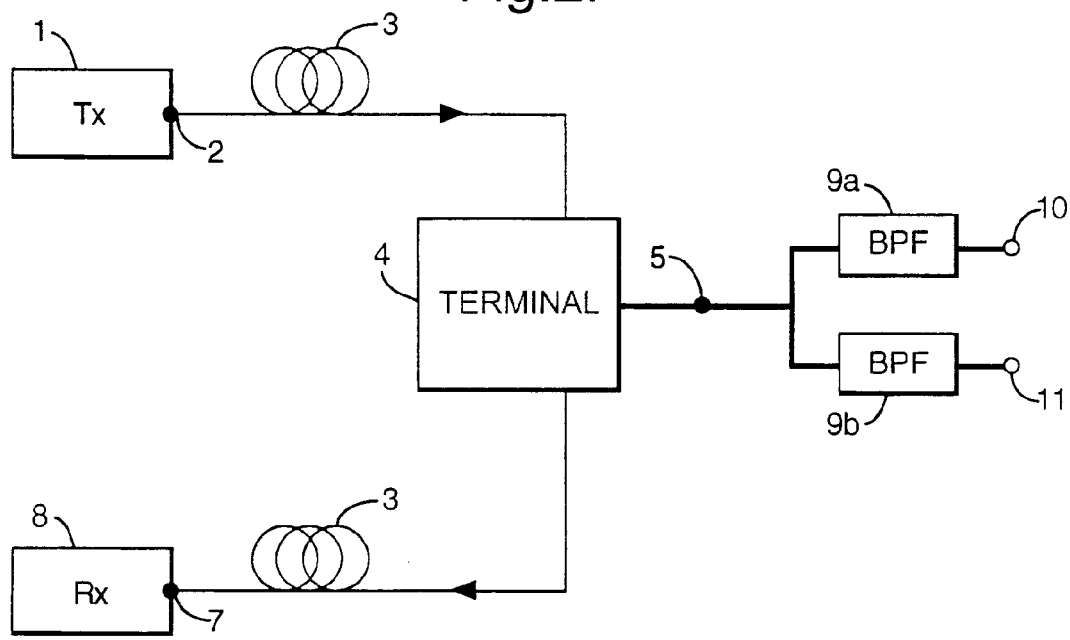

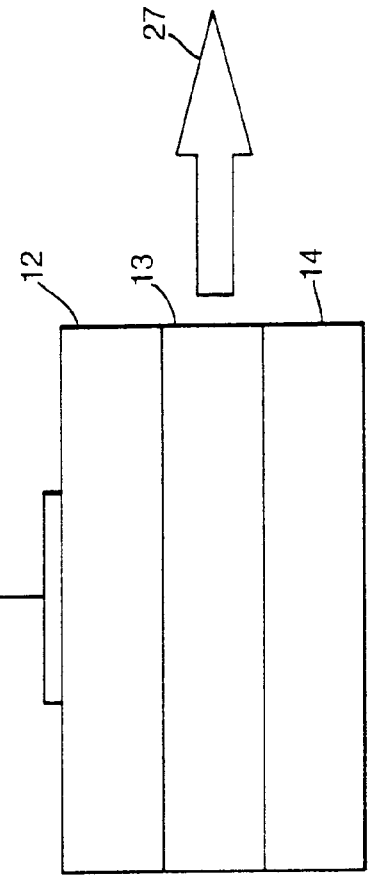
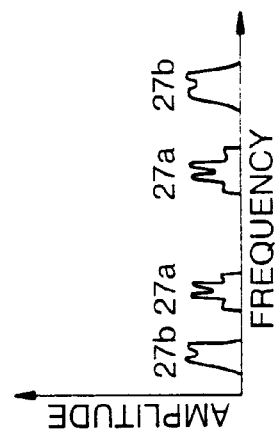
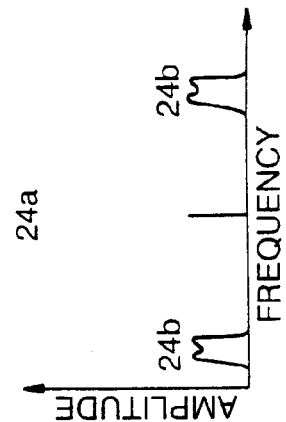

——— MODULATOR FIBRE TO FIBRE TRANSMISSION CHARACTERISTIC (15)

—·——·— FIRST DERIVATIVE OF FIBRE TO FIBRE TRANSMISSION CHARACTERISTIC (16)

— — — — SECOND DERIVATIVE OF FIBRE TO FIBRE TRANSMISSION CHARACTERISTIC (17)

— — — — THIRD DERIVATIVE OF FIBRE TO FIBRE TRANSMISSION CHARACTERISTIC (18)

KEY:
- BACK TO BACK MEASUREMENTS
- + CHANNEL 1 TRANSMISSION OVER 25 Km OF FIBRE FROM EAM 1 TO EAM 2
- △ CHANNEL 1 TRANSMISSION FROM DFB1 THROUGH EAM 1, OVER 25 Km OF FIBRE AND DETECTED AT EAM 2

($E_b/N_o$=18 dB)

Fig. 15.
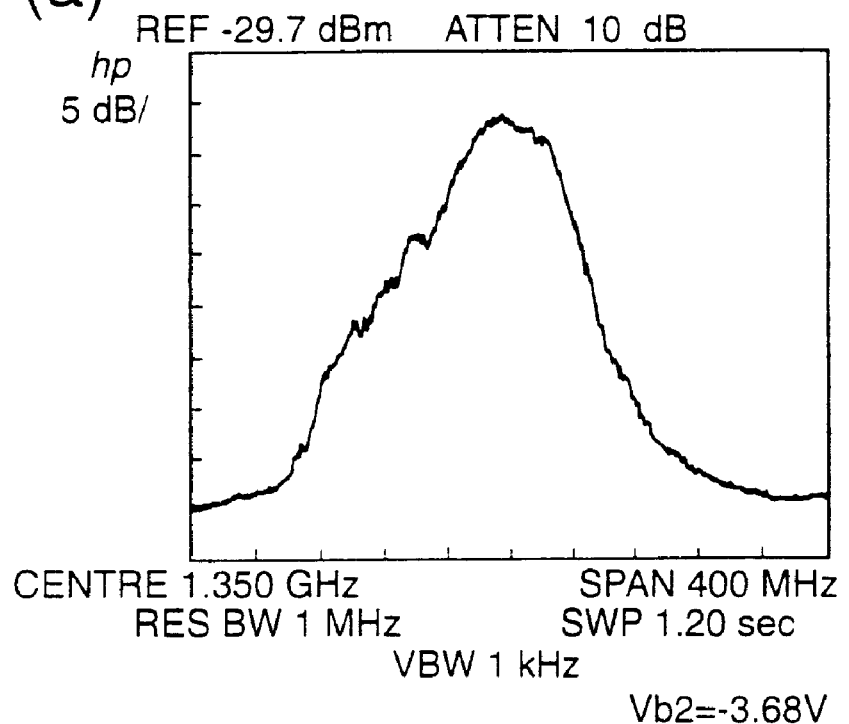
(a)
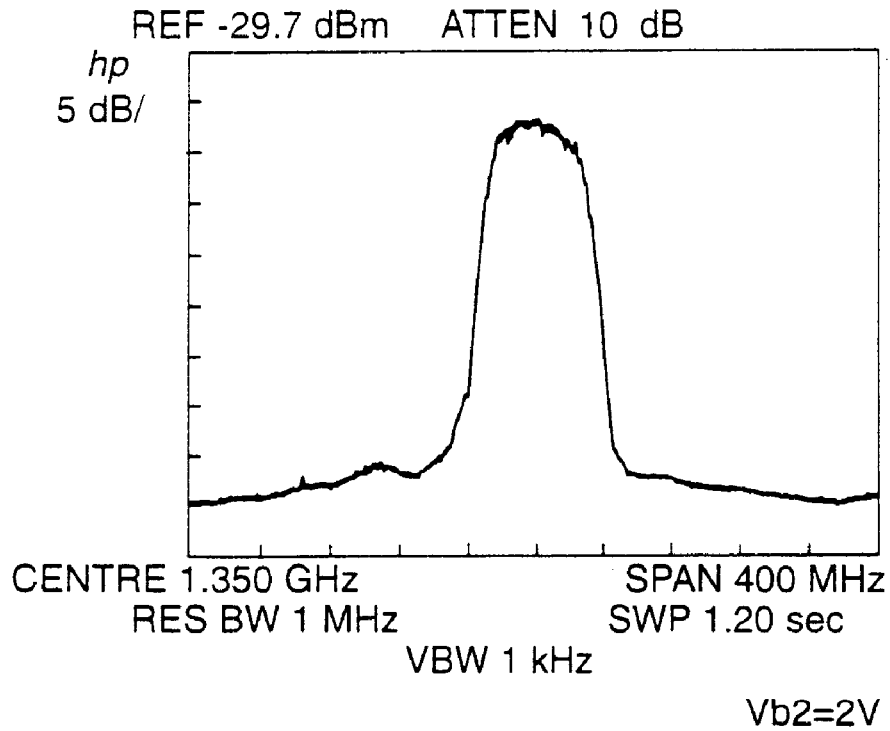
(b)

TELECOMMUNICATIONS SYSTEM SIMULTANEOUSLY RECEIVING AND MODULATING AN OPTICAL SIGNAL

BACKGROUND OF THE INVENTION

1. Field of the Invention

The present invention relates to optical communications systems, terminals for use in systems, to optical links including such terminals, to cellular and radio distribution points and base stations and in particular, but not exclusively, to radio and microwave systems, including cellular radio systems, including such links.

2. Related Art

It is known that one of the principal problems that must be addressed before optical fibre networks can be extended from trunk networks to the local loop is the cost and complexity of the remote terminals. These terminals need to be able to both receive and transmit optical signals. Most solutions to this problem use lasers as optical transmitters but this necessitates the use of control circuitry which increases the cost, complexity and electrical power consumption of the terminals.

A similar problem, although with a slightly different application, exists for optical fibre feeds to antennas for cellular and other radio and microwave systems where the cost and power consumption of terminal equipment used to supply signals to remote antennas are important factors. "Antenna remoting" as it is known is of particular interest for cellular and satellite systems. The frequencies involved are typically in the hundreds of Mhz to tens of GHz range. There is also interest in yet higher frquencies, for example for radar. While, strictly speaking, this range extends into what is more properly known as the millimetre wave band, throughout this specification the expression "radio or microwave" has been used loosely to cover this wider range. Thus, unless the context clearly requires otherwise, the term should be read in a broad way to include the millimetre wave band.

Embodiments of the present invention seek to solve, at least in part, these problems.

In the paper by Frigo et al, "A wavelength division multiplexed passive network with cost-shared components", IEEE Photonics Technology Letters, 1994, volume 6, pp. 1365–1367, it is proposed that subscriber terminals in a passive optical network (PON) each be provided with an optical modulator in place of the conventionally proposed laser. A single, cost-shared tunable laser is provided in the central office which feeds the PON and this is wavelength stepped through the different wavelengths of the various optical network units (ONUs) which feed the subscribers connected to the PON. In each subscriber's ONU, the laser light received from the shared laser is split by a passive tap, with a portion of the light being detected by a receiver. The remainder is "looped-back" towards the central office through the modulator. The relevant subscriber uses the modulator to modulate the time-slice of light received from the shared laser. The up-and-down-stream signals can be separated at the central office by time partitioning, wavelength, sub-carrier frequency, format, modulation depth, gating, coding, etc. The preferred separation technique involves the use of radio frequency sub-carrier modulating the downstream (from the central office) data. As described, half of the packet of light in each ONU's laser timeslot is modulated at the central office, the other half is modulated at the ONU to provide the upstream data link. The same RF sub-carrier frequency is used for the up and down stream signals. Use of the technique for the transmission of video on demand signals is described. The nature of the modulator used in the ONU is not revealed.

Wood et al describe, in "Bidirectional fibre-optical transmission using a multiple-quantum-well (MQW) modulator/detector", Electronics Letters, 1986, volume 22, pp. 528–529, a bidirectional optical fibre transmission system in which one end of the fibre link has an MQW modulator in place of the more conventional laser and detector pair. At the other end of the single-fibre was a laser, and a beam-splitter was used to divert the return optical signal to an avalanche photodiode receiver. To send data from the MQW modulator to the laser site, the laser was operated quasi-CW and the modulator, which included a gold mirror and was operated in reflection mode, used to intensity modulate the reflected light. In the opposite direction the laser was directly modulated and the MQW modulator was used as a photodetector. While no changes were made to the optical system to achieve reversal of the direction of information flow, it was necessary both to re-arrange the electrical drive components and to modify the DC biases of the laser and of the MQW device. It was thus not possible to have a fully duplex operation (i.e. simultaneous transmission in both directions). Half-duplex operation would have required some electrical switching and bias adjustment function to control the bias level and to effect the re-arrangement of the circuit in synchronism with the half duplex rate. In fact, no such electrical control arrangement is suggested in the paper.

R B Welstand, et al, describe in "Dual-Function Electroabsorption Waveguide Modulator/Detector for Optoelectronic Transceiver Applications", IEEE Photon, Tech. Lett. Vol.8, No. 11, pp 1540–1542, a bulk (non-MQW) electroabsorption modulator device which is useful both as a modulator and as a detector. The device is referred to as an optoelectronic transceiver. A suggested application of the device is in antenna remoting. Again, the transceiver requires an adjustable dc electrical bias to switch from modulator to detector operation. It is explained that the transmit mode and the receive mode can be remotely switched by control circuitry which can adjust the dc electrical bias with a switching time limited by the associated electronics. Separate experiments were performed to determine the optimum performance of the device as a modulator and as a photodetector. In the modulator assessment, different bias levels were used depending upon the type of performance required. Optimum bias levels of 2.0 and 2.93 volts were found. It was also explained that, in order to maintain high suboctave and multioctave spurious-free dynamic range modulator performance over temperature, active modulator bias control was required. In the detector experiments, the device was biased at 7.0 volts. There is no hint or suggestion that the device could provide both funtions simultaneously. Thus, again it is clear that full duplex operation was not possible.

SUMMARY OF THE INVENTION

The present inventors have discovered that it is possible to provide good performance over both transmission directions in an optical link in which an optical modulator is used both as a modulator and as a detector even when the modulator is subject to the same DC operating conditions in both operational modes. That is, as distinct from the above-identified teachings, systems according to the present invention do not need complex electrical bias control. Indeed, for very many commonly available modulators, perfectly acceptable system performance can be achieved with no bias at all, that is with zero bias.

The fact that a single bias level can be used for transmission in both directions makes possible full duplex operation—that is, simultaneous transmission in both directions. Of course, the invention also has application to systems which are not, or are not run, full duplex. The advantages of simplicity, compactness and low-cost of terminal equipment, which all follow from the invention, are all equally useful in systems run half-duplex, e.g. ping-pong (time-division multiplex) systems. Again, for the many installations which can be run without electrical bias in the remote terminal, the fact that no local power supply is needed is a tremendous benefit. This is especially true in the field of antenna remoting.

Accordingly, in a first aspect the present invention provides a method of communicating between a first node and one or more further nodes in an optical communications system, the method comprising;

i) receiving at the first node, an optical signal transmitted from a first further node over an optical fibre link;

ii) detecting, at the first node, the optical signal using an electro-optic device and producing thereby an electrical signal representing information carried by the optical signal; and iii) imposing, using said electro-optic device, an information-carrying modulation onto the received optical signal and feeding the thus modulated optical signal into an optical fibre link to transmit it to a second further node; wherein step ii and step iii are carried out with the electro-optic device subject to the same DC operating conditions. Preferably said first further node and said second further node are a single node. Preferably the DC bias voltage applied is zero—that is no DC bias at all is applied. Preferably, the electrical signal is an RF or microwave signal.

According to a second aspect of the invention there is provided an antenna installation for a radio or microwave transmission system, the installation comprising: antenna means for transmission and reception of radio-frequency or microwave signals; optical input and optical output ports; an optical modulator arranged in the optical path between the optical input port and the output port and operatively connected to the antenna means and arranged in use to receive RF or microwave signals therefrom and to impose a corresponding modulating onto light received via said input port and which passes to said output port; and optical detection means arranged in use to receive optical signals via said input port and operatively connected to the antenna means so that RF or microwave modulation present in said optical signals is coupled out to said antenna means from which it is then radiated.

Preferably the optical detector means are provided by the optical modulator.

Preferably the optical detector means and the optical modulator are electrically unbiased in operation.

Additionally it is preferred that the modulator is an electro-absorption modulator.

Further preferably the terminal is sited remotely from a base station or central office from which it receives optical signals carrying an RF or microwave component.

According to a third aspect of the invention there is provided an optical communications network featuring a remote terminal characterised in that said terminal comprises an electro-optic device that (i) detects an incoming optical signal from a first portion of the optical communications network whilst simultaneously (ii) modulating said incoming optical signal, said optical signal being transmitted to a further portion of the optical communications network.

Preferably the optical signals are analogue signals. In addition it is preferred that the optical communications network uses a frequency division multiplexing system.

According to a fourth aspect of the invention there is provided a method of operating an optical communications network, the method being characterised in that an optical signal is respectively received and modulated simultaneously by controlling a single electro-optic device.

BRIEF SUMMARY OF THE INVENTION

The invention will now be described, by way of example only, with reference to the following drawings in which:

FIG. 1 is a schematic depiction of an optical communications network featuring a terminal according to the invention and a remote antenna;

FIG. 2 is a schematic depiction of an optical communications network featuring a terminal according to the invention;

FIG. 3a is a schematic cross section of an electro-absorption modulator suitable for use in a terminal according to the invention;

FIG. 3b is a schematic depiction of a typical input optical data signal;

FIG. 3c is a schematic depiction of the electrical data signals present at the electrical contacts of a terminal according to the invention;

FIG. 3d is a schematic depiction of a typical output optical data signal;

FIG. 15 shows the RF electrical spectra obtained at the output of EAM 2 of FIG. 13;

DETAILED DESCRIPTION OF EXEMPLARY EMBODIMENTS

Figure 4:
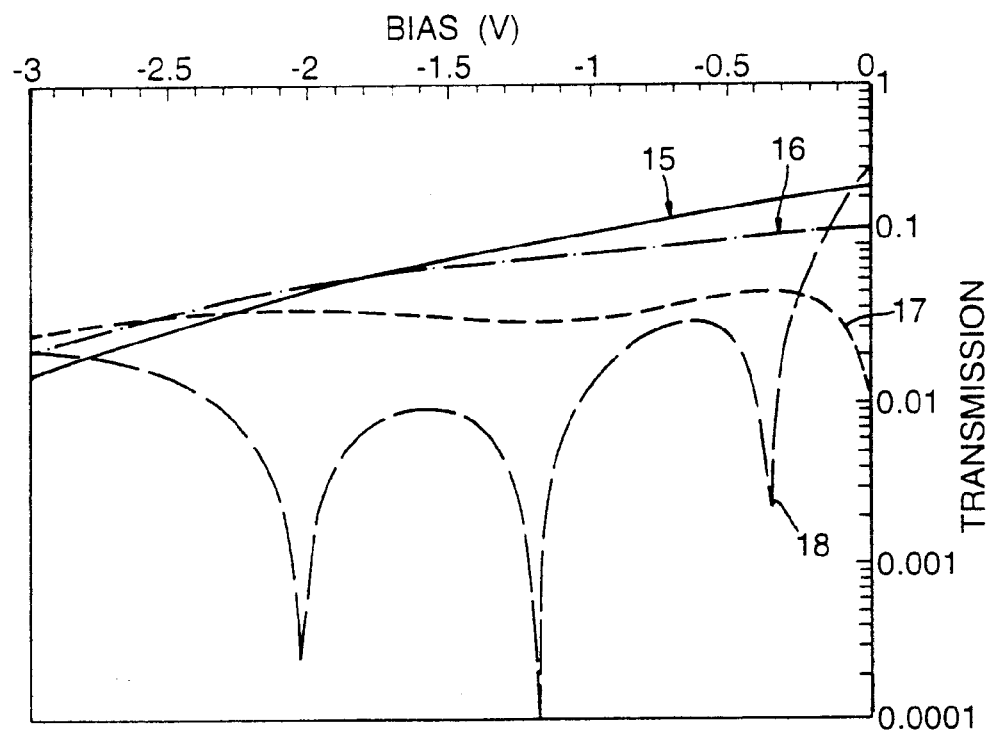
FIG. 4 is a graph of fibre to fibre transmission for a suitable electro-absorption modulator (such as that shown in FIG. 2) alongside the first three derivatives of the transmission function with respect to bias voltage.

FIG. 1 shows an optical communications network including a terminal 4 according to the invention. The convention that will be used in the following analysis is that the network path from the optical input 2 to the electrical contacts of the terminal will be termed 'downstream' and the network path from the electrical contacts 5 to the optical output 7 will be termed 'upstream'. The fine lines indicate an optical fibre transmission path and the arrows on the fine lines indicate the direction of signal propagation along the optical fibre transmission path. The thicker lines indicate an electrical transmission path.

An analogue optical signal, consisting of a plurality of frequency division multiplexed (FDM) data streams, is introduced into the optical fibre 3 at the optical input 2 by the optical transmitter 1. The terminal 4 includes an electro-absorption modulator (EAM), a schematic example of which is shown, for illustrative purposes only, in FIG. 3. The EAM comprises three main layers of semiconductor material. The outermost semiconductor layers 12 and 14 enable electrical contacts to be mounted to the EAM in order that bias voltages and electrical data signals might be applied to the device. The active central layer 13 is either a layer of bulk semiconductor material or multi-quantum-well (MQW) material, which, as is well known, is formed from many interleaved layers of different semiconductor materials. In order to receive and modulate optical signals transmitted at a given wavelength it is necessary to choose suitable semiconductor materials for use in the central layer of the EAM. A combination of III–V materials are often chosen, for example gallium arsenide (GaAs), indium phosphide (InP), indium gallium arsenide phosphide (InGaAsP), etc. as these have bandgap energies which are appropriate for the wavelengths used in optical communications systems.

An example of an EAM with an active central layer formed from a single semiconductor layer is found in CK Sun et al, "High Spurious Free Dynamic Range Fiber Link Using a Semiconductor Electroabsorption Modulator", Electronics Letters, 1995, 31, pp 902–903. In the case cited the central layer is 350 nm of undoped InGaAsP, which had a bandgap equivalent wavelength of approximately 1.24 $\mu$m.

A suitable MQW structure for use in an EAM is seventeen 9.5 nm wells of InGaAsP (bandgap wavelength≈1.55 $\mu$m) separated by 5.5 nm barriers of InGaAsP (bandgap wavelength≈1.10 $\mu$m). Further details describing the construction of such a device can be found in European Patent EP-B-143000.

Currently, higher saturation thresholds are available with bulk rather than MQW modulators, but higher bandwidths may be achieved with MQW rather than bulk devices. While work is underway in various research groups to increase the saturation threshold (and the damage threshold) of MQW modulators, these considerations may affect choice between the use of bulk and MQW modulators in different applications of this invention.

It will be understood that subject to the above proviso either a suitable bulk EAM or a suitable MQW EAM may be used in the embodiments discussed below. The following discussion relates to the MQW EAM described above, but the principles of the operation of the MQW EAM are the same as for a bulk EAM.

When an optical signal, transmitted at an appropriate optical wavelength, arrives at the EAM, a proportion of all its frequency components is absorbed within the active central layer 13 generating an electrical signal at the electrical contacts 5. The large arrows in FIG. 3*a* show the transmission of the optical signal through the active central layer of the EAM. In FIG. 3*b* optical signal 24 is an example of an incoming optical signal. It comprises an optical carrier frequency 24*a* and identical sidebands 24*b*, the sidebands containing the information that is conveyed by the optical signal. Typically the optical carrier frequency will have a frequency of hundreds of gigahertz, the sidebands will have a width of tens or hundreds of megahertz and the centre of the sidebands will be separated from the carrier frequency by a few gigahertz.

The optical signal is partially detected within the EAM and an electrical data signal 25 with a substantially similar frequency spectrum to that of one of the sidebands 24*b* is generated within the EAM and passes through the electrical contacts 5. Electrical data signal 26 is applied to the electrical contacts 5 and causes the modulation of the carrier frequency 24*a*. FIG. 3*c* shows electrical data signals 25 and 26, as present at the electrical contacts of the terminal.

The modulation of the carrier frequency 24*a* by the electrical data signal 26 gives rise to sidebands 27*a*. Sidebands 27*a* have identical frequency spectra, which are both substantially similar to the frequency spectrum of electrical data signal 26. The optical signal at the output of the EAM consists of sidebands 27*a*, generated by the modulation of the carrier frequency by the EAM, and sidebands 27*b*, which are the residual remnant of sidebands 24*b*. Sidebands 27*a* occupy a frequency band which is intermediate to the frequency of the carrier frequency 24*a* and the frequency band of sidebands 24*b* such that the two sets of sidebands do not overlap each other. FIG. 3*d* shows, schematically, the arrangement of output optical signal 27 comprising sidebands 27*a* and sidebands 27*b*.

With regard to FIG. 1, electrical data signal 25 passes into the antenna 6 from which a radio signal (which might be a microwave signal) 28, carrying substantially the same information as electrical data signal 25, is radiated. The antenna will also receive radio signals (which again may be microwave) 29, within a suitable range of frequencies, which will constitute electrical data signal 26. Electrical data signal 26 will, at the electrical contacts, modulate the carrier frequency 24*a* of the received optical signal.

A terminal operating in such a manner can be used in a cellular radio communications network. For example, an optical signal containing data within the frequency band 925 MHz to 933 MHz is transmitted by the optical transmitter 1. The signal contains 320 channels, each consuming approximately 25 kHz of bandwidth. This signal is detected within the EAM and generates an electrical data signal 25 that is transmitted as a radio signal 28 by the antenna 6. The data contained within the radio signal is substantially the same as the data contained within the optical signal. Cellular telephones receive the radio signal and use filtering means to extract the 25 kHz channel applicable to the individual cellular telephone. The cellular telephone transmits a signal occupying a 25 kHz frequency band, the signal being contained within the frequency band 880 MHz to 888 MHz. The antenna 6 receives a radio data signal 29 contained within the frequency band 880 MHz to 888 MHz which is the combination of the transmission of all the cellular telephones communicating with the communications network via the said antenna. The antenna converts said received radio data signal 29 into an electrical data signal 26 which is used to modulate the optical carrier frequency 24a of the transmitted optical signal to create an optical signal 27 that contains data in both the 880–888 MHz frequency band and the 925–933 MHz frequency band. This data propagates along the optical fibre and is received at the optical detector 8.

Figure 5:
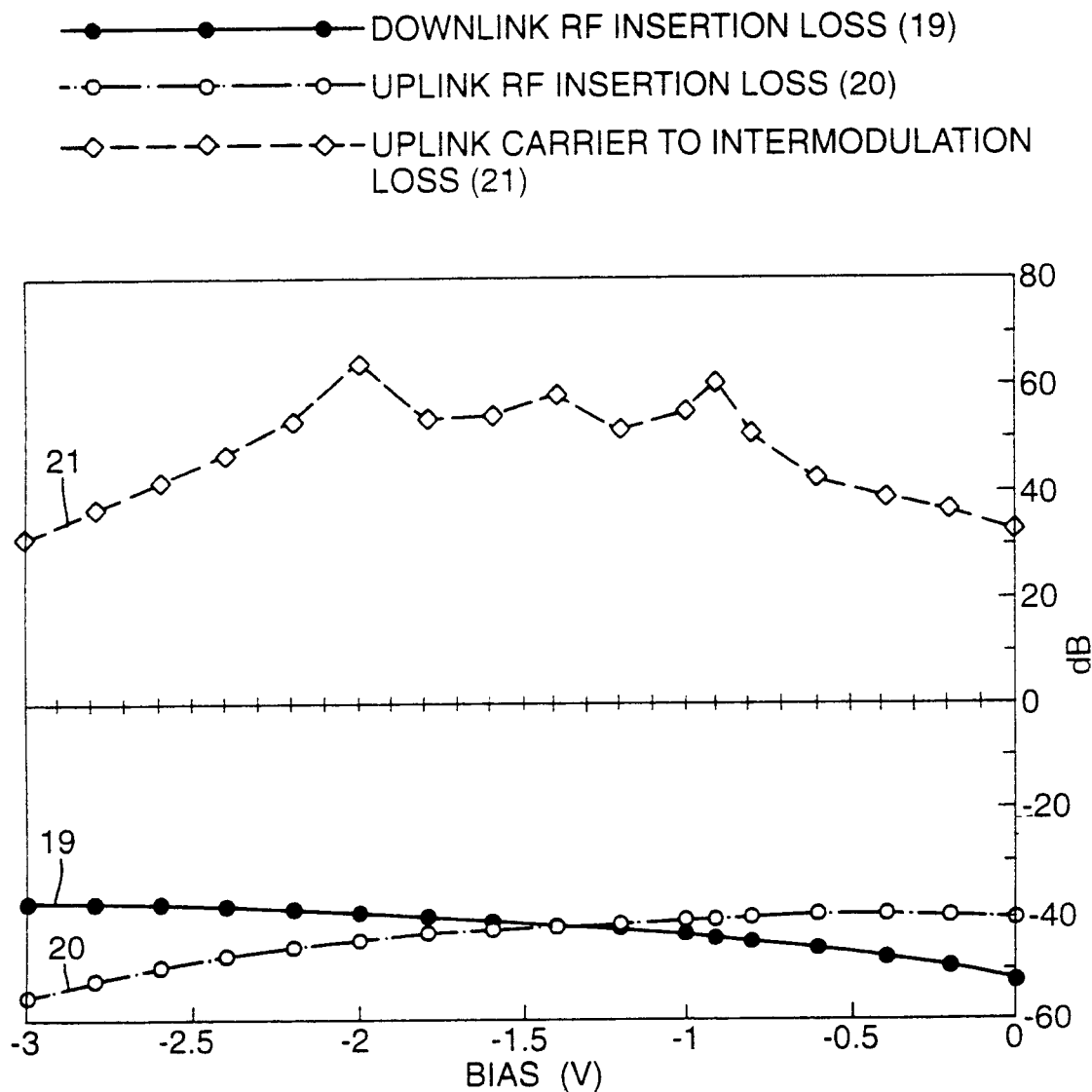
FIG. 5 is a graph showing the variation of insertion gain and carrier intermodulation with respect to bias voltage.

It is possible to extract simultaneously an electrical signal from or input a second electrical signal to the electrical contacts. The presence of both input and output electrical signals in the EAM will give rise to signal inter-mixing. This can lead to distortion of the downstream and upstream optical signals and will limit the performance of the EAM. FIG. 4 shows the variation in fibre to fibre transmission with bias voltage 15 in a suitable EAM with an MQW active central layer which has a composition as described above. The first derivative of this transmission function with respect to bias voltage 16 influences the upstream loss, the second derivative of this transmission function with respect to bias voltage 17 influences the upstream-downstream mixing and the third derivative of this transmission function with respect to bias voltage 18 influences the distortion of the upstream signal. FIG. 5 shows typical RF insertion loss characteristics for the downstream link 19 and the upstream link 20 as the bias voltage is altered, using a 4 mW DFB laser with a wavelength of 1560 nm as the transmitter. The upstream and downstream losses can be made equal at a reverse bias of −1.4V, not needed obviously, and the insertion loss of ≈42 dB for this case is comparable with the insertion loss of the laser-detector modules used (without a modulator) of 39 dB. FIG. 5 also shows the ratio of the upstream carrier to the third order intermodulation 21, which is influenced by the third derivative of the modulator transmission function 18. The maxima in 21, observed for bias voltages between −0.9V and −2.0V broadly correspond to the minima in 18. It can be observed that for the EAM used in this example the effects of upstream distortion (influenced by 18) are more significant than the effects of upstream-downstream mixing (influenced by 17), therefore it is advantageous in this example to control the modulator bias voltage in order to minimise distortion of the upstream signal. It will be understood that if a different EAM were to be used, there would be a different transmission characteristic with respect to bias voltage 15 and this will lead to differing derivatives of that function with respect to bias voltage (16, 17 and 18). The nature of these derivatives will determine which of them will have the greatest effect on the performance of the terminal and thus which derivative should be controlled by varying the bias voltage for optimal terminal performance where a bias voltage is to be applied.

The advantages of using analogue optical networks for delivering radio signals from a central location to many remote antenna sites has long been recognised. In a telecommunications context, these radio signals may be for fixed radio access, cordless or mobile networks, but the same principles apply. By making use of the high bandwidth, low loss characteristics of optical fibre, all high frequency and signal processing functions can be performed centrally and the signals can then be transported over the optical network directly at the carrier frequency. The remote sites then become very simple, requiring only optoelectronic conversion, filtering and linear amplification. This shifting of the complex functionality away from the remote site allows cheap, reliable, small and lightweight radio access points with low power consumption to be deployed. Ease of installation coupled with low maintenance provide compelling arguments for this type of system architecture. The main telecommunications application area for this type of system is short range and high capacity wireless systems where the advantages of small, cheap and low power transceiver units give the greatest benefit.

Although the generic radio fibre system architecture described in the preceding paragraph leads to low power consumption and low component count in the radio access point, it would be even more desirable to have zero power consumption. This entirely passive radio access point would make installation very straightforward, and give excellent reliability leading to virtually maintenance-free operation. In this example we show that an electroabsorption modulator may be used as the single component in such a radio access point, requiring no amplifiers or power supply to function effectively as a passive transceiver for small-sized cells (picocells).

As described above, the EAM can act as a photodetector for the downstream path, and as a modulator for the remaining downstream light for the upstream path. The feasibility of a full duplex link using a frequency division duplex (FDD) arrangement, showing that both detection and modulation functions can be enacted simultaneously, has been described above. In this example we show that this device will also operate satisfactorily without dc bias for short range (picocellular) radio systems. In this architecture, a picocell is envisaged to provide radio coverage for future high capacity wireless services (e.g. the HIPERLAN standard which will provide data rates of 10 Mbit/s or more) to a volume no greater than a single office or room (although as will be seen below, picocells have application to outdoor and indoor but "non-room" (e.g. concourse, station, stadium, plaza, etc.) applications where larger volumes/areas must be servred. At present, these future high capacity radio systems are still in the research phase. For this work, therefore, the passive transceiver concept was demonstrated using a commercial 2.4 GHz spread spectrum radio LAN providing wireless Ethernet at a raw data rate of 3 Mbps. At this data rate, mobile video access was feasible and was achieved, and access to the Internet was obviously no problem.

The electroabsorption modulator used in this experiment was designed and fabricated in-house and consisted of a multiple quantum well absorption layer in a low capacitance buried heterostructure arrangement, as described by Moodie et al in J Lightwave Tech, Vol. 14, No.9, pp 2035–2043, 1996. The InGaAsP/InP material system was used for operation around a wavelength of 1550 nm. The chip, with a length of 370 $\mu$m, was mounted in a high frequency package with fibre pigtails, and had a total fibre to fibre loss of only 5 dB at zero bias. The 3 dBe bandwidth of the packaged device when operated as a modulator was 14 GHz, although for this experiment we only require a narrowband response around 2.5 GHz.

Figure 8:
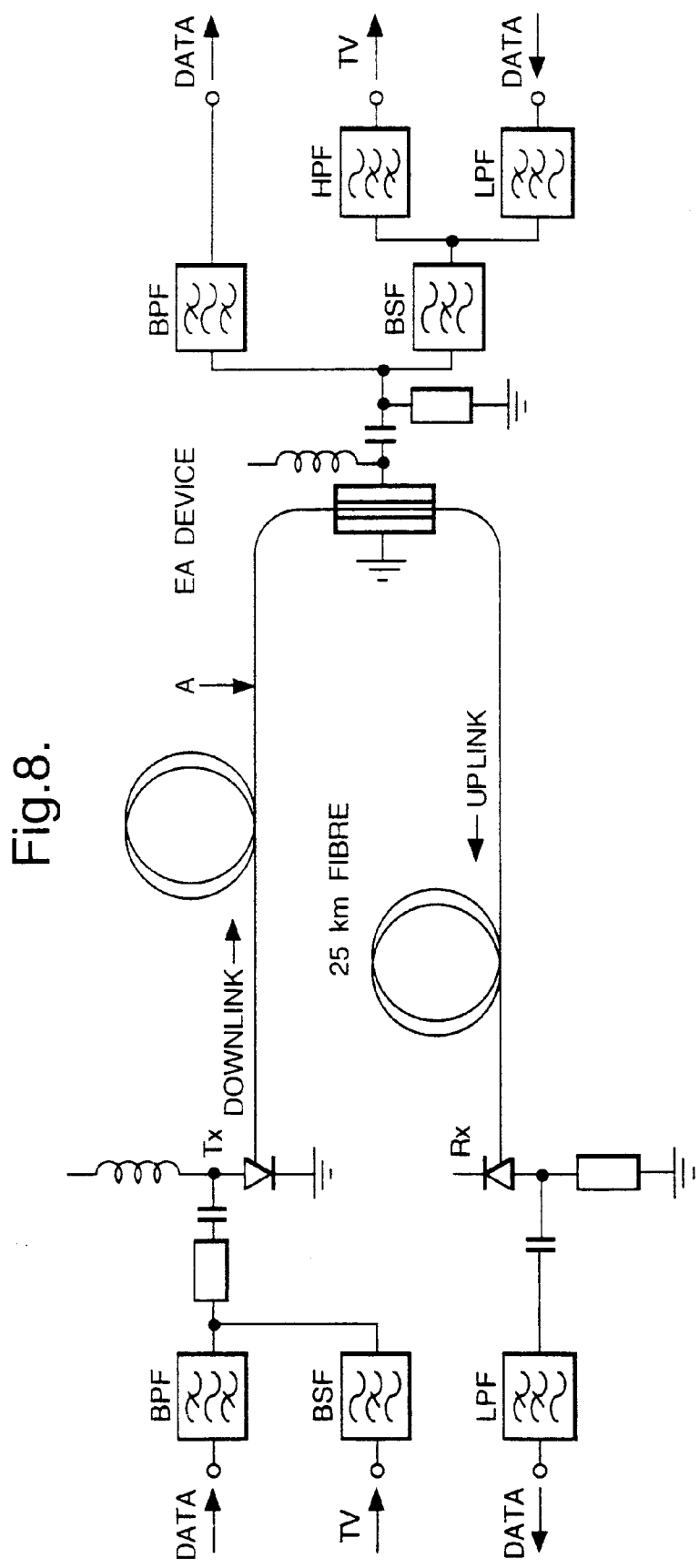
FIG. 8 is a schematic depiction of an experimental transmission system in which an EA modulator is used at the remote terminal.

FIG. 8 shows the experimental layout in schematic form. The radio modems consisted of a BreezeNet (TM) Access Point (AP) at the central office and a BreezeNet (TM) Station Adaptor (SA) for connection to the laptop computer located in the picocell. These modems operate in the IMS band (2.4–2.48 GHz) and use frequency hopping spread spectrum to provide good immunity to sources of interference. The system provides half duplex transmission, although, as described above, the optical link is not limited to this arrangement. The AP had twin antennas for spatial diversity, which could be detached very simply to allow connection to the optical link.

For the downstream path, the RF output from the AP was connected to a commercial analogue laser. The optical signal from this laser was passed thorugh a polarisation controller (PC) and across the optical link to the EAM located in the remote picocell. In this direction, the EAM acts as a photodiode, and the resulting RF power was then radiated into free-space using an antenna, to the SA connected to a laptop computer.

For the upstream path, the RF output from the SA is radiated into free-space to the antenna connected to the EAM. These RF signals then modulate the residual optical power that passes through the EAM, and are then sent back to the central office over the optical link. The upstream signals are detected using a commercial photodiode, and are then input to the receiver part of the AP. The laser and photodiode were designed for analogue microwave links.

Results

The picocell used in this experiment was an office with dimensions of 6 m×3.5 m. The antenna for the passive radio access point (which was fed with the RF output of the modulator) consisted of a simple microstrip patch design with a gain of 8 dBi. This was a bow-tie design with a beam width of around 70 degrees. The SA was configured to use one antenna for the transmit direction (2 dBi omnidirectional) and a separate antenna for the receive direction (8 dBi microstrip patch). This arrangement had the combined benefits of providing a better power balance for the link (see below) and also limited the transmit power to below 20 dBm to ensure compliance with EIRP requirements in Europe for radio LAN systems.

Before connecting the radio system, power budget measurements were performed using a signal source and analyser at a frequency of 2.5 GHz. Table 1 shows the rf power levels at the important points throughout this system, when the antennas were spaced 6 m apart. At this spacing, the free space path loss was 50 dB, which is 6 dB less than calculated when no reflections are assumed. The optical link RF loss for the downstream path (laser to electroabsorption modulator) was 40 dB, which was only 5 dB worse than the loss measured when the photodiode was used in place of the EAM. The upstream (electroabsorption modulator to photodiode) optical link RF loss was 35 dB. A balanced optical link loss can be achieved if the EAM is biased appropriately, but for passive operation at this wavelength the downstream link loss is higher than the upstream loss since the EAM is not an efficient photodetector at zero bias. However, the overall radio-fibre link (taking the radio link loss into account) was more or less balanced, as a result of choosing the appropriate antenna gain for each direction at the SA. In fact, in the total link the downstream loss was 80 dB, and 75 dB upstream.

Figure 17:
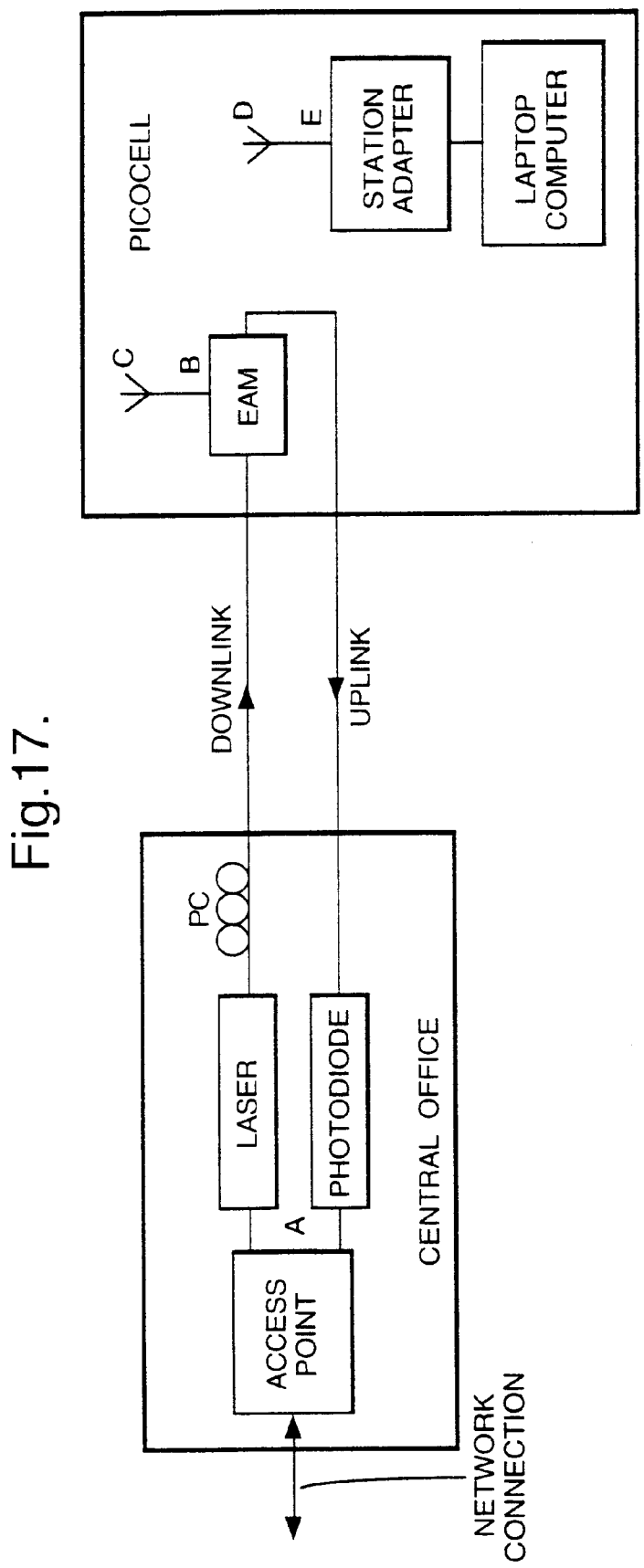
FIG. 17 shows schematically a pico cell system according to the invention.

TABLE 1 rf power levels throughout the system (see FIG. 17)

| Point | A | B | C | D | E |
|---|---|---|---|---|---|
| Downstream power, dBm | +17 → | −23 → | −15 → | −65 → | −63 |
| Upstream power, dBm | −58 ← | −23 ← | −31 ← | +19 ← | +17 |

The radio system was connected to the optical link and connection was made to a local Ethernet network. Full rate transmission was possible with the passive radio access point antenna located on a wall at one end of the office, and the SA antenna free to roam within the picocell. The receiver sensitivity of the BreezeNet (TM) radio modems was −64 dBm for operation at the full rate of 3 Mbps, −72 dBm for operation at 2 Mbps and −82 dBm for the lowest rate of 1 Mbps. From table 1, it can be seen that the power requirements for 3 Mbps are easily satisfied within the picocell. Range calculations based on an (upstream-limited) receiver power of −58 dBm and the receiver sensivies given above suggest that (unobstructed) cell sizes of approximately 12 m (3 Mbps), 30 m (2 Mbps) and 95 m (1 Mbps) are achievable with this system. Assuming that we operate at a data rate of 1 Mbit per second, the total available margin is 99 dB for each direction based on the transmit power of +17 dBm and a receiver sensitivity of −82 dBm. The remaining margin in the picocell is therefore 19 dB (downlink) and 24 dB (uplink). If we make the simplistic assumption that the path loss varies as the square of distance (free-space propagation) then this margin translates into a range of 27 meters for the downlink and 48 meters for the uplink.

The radio system chosen for this work to demonstrate the 'passive picocell' concept is well suited for the purpose due to its half duplex, frequency hopping spread spectrum design, which means that only one frequency carrier is present at any one time. Operating the EAM at zero bias results in non-linear operation, especially in the upstream path, which would introduce intermodulation distortion in multi-carrier systems such as GSM. If passive operation were not required, a small bias, around 1 V or less, would be sufficient to move to a linear part of the modulation characteristic where intermodulation distortion is acceptable. Since the EAM photocurrent is around 1 mA, the total dc power requirement is only 1 mW, and can therefore be satisfied by a small battery or possibly even a solar cell or cells located at or adjacent the base station or its antenna. Furthermore, it would be possible to redesign the EAM to operate in a linear regime at zero applied bias so that passive operation could still be achieved. For example, MQW modulators having an in-built bias, such as those described in EP-B-0416879, could be used.

Figure 18:
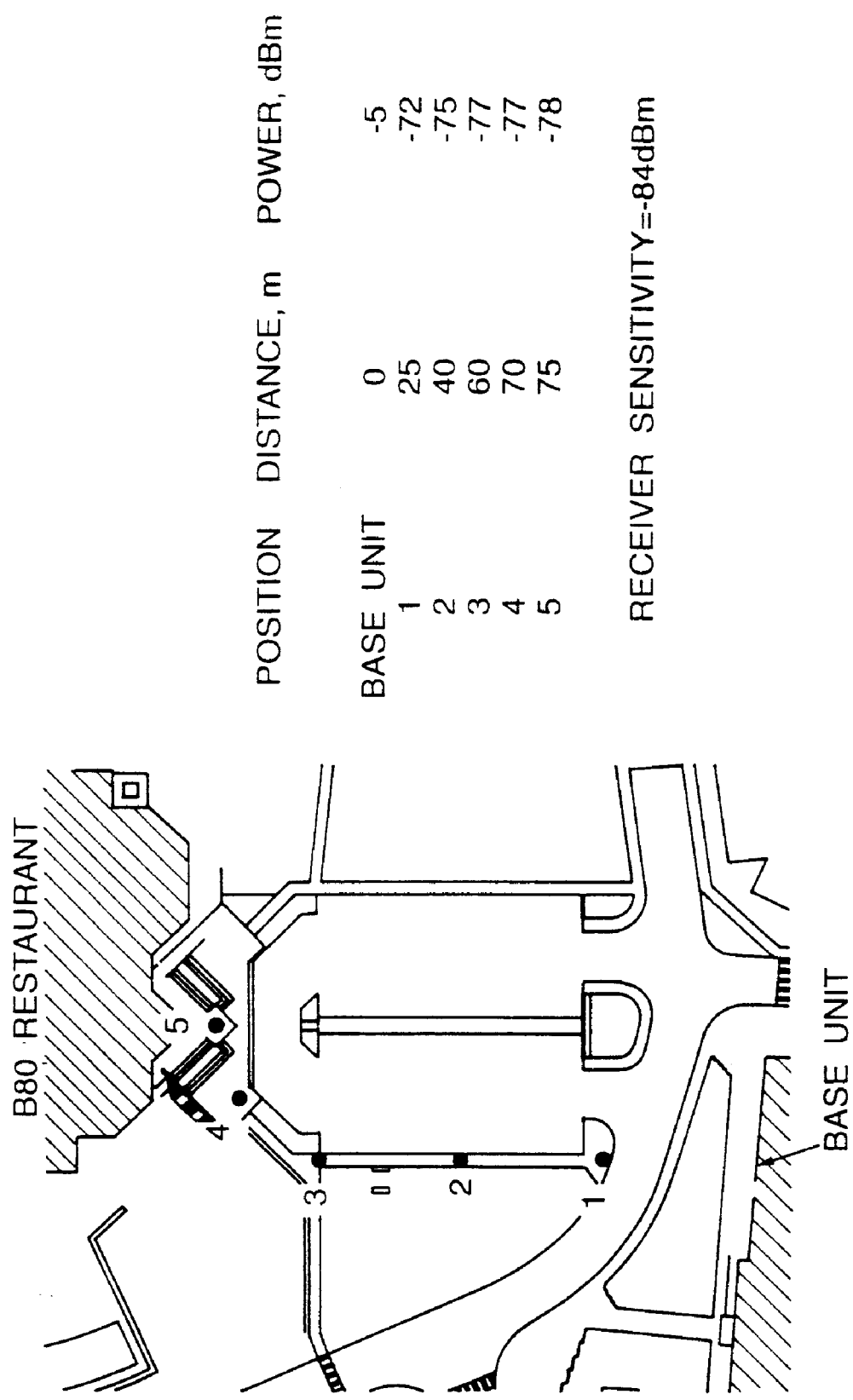
FIG. 18 is a map of the site of an outdoor demonstration of the passive picocell showing downlink power levels against distance.

For the purposes of demonstrating the concept behind the work, the optical link length was initially only 30 m, although much greater lengths will be feasible. The major consideration in this case is optical loss, which affects the upstream path especially. Every 1 dB of optical loss translates into 4 dB of upstream electrical loss, which means that the 6 dB of power margin at 3 Mbps for the 6 m picocell equates to a 1.5 dB margin in optical loss. Assuming a fibre loss of 0.2 dB/km this gives an optical link length of 7.5 km. For 1 Mbps operation in the 6 m picocell, an optical link length of 30 km will be possible. FIG. 18 shows the trade off between optical link length and radio link length for each system data rate based on this assumption of fibre loss.

The ultimate cost of the EAM transceiver will determine whether this type of system is deployed on a large scale. The present device is expensive to package, mainly due to the labour intensive fibre pigtailing process. Integrated mode transformers, which allow passive positioning of the fibre pigtail, should reduce packaging cost significantly. Suitable mode transformers are described in WO95/23445. Further reductions will be possible using a reflection modulator, which only needs one pigtail attachment. Particularly interesting reflection modulators are described in WO91/19219.

Several options are available to improve the signal-to-noise ratio at the receiver and therefore increase the radio range. Some of the potential improvements that can be made are given below together with an estimate of their general practicality and effectiveness.

DOWNLINK

External Modulator

Rather than applying the modulation directly to the laser source, it would be possible to use an external modulator such as a lithium niobate Mach Zeander modulator. This could give a signal to noise ratio increase of about 20 dB which would be a range increase factor of 10—the reason being that lasers capable of being modulated with RF are typically fairly low power whereas if an external modulator is used the laser is only required to operate CW and one could launch, for example, 50 mW at the head end. Instead of using a lithium niobate modulator one could use another electro-absorption modulator, but lithium niobate has the advantage that large bandwidth, low insertion loss devices are relatively easy to come by. With a high launch power one would need to consider the problem of saturation in the electro-absorption modulator in the picocell. One could use either modulators using bulk absorption layers, such as those available from NEC, or one could use MQW devices with high saturation powers—for example those using barriers made of indium aluminium arsenide with wells of indium gallium arsenside phosphide.

More Efficient Laser

As an alternative to the use of an external modulator and high power source, one could continue to have direct modulation of the laser but use a more efficient device than that used in our experiments to date. It should be possible to get a signal to noise ratio increase of 10 dB, a range increase factor of 3.2.

Higher RF Transmit Power

With direct modulation of the laser, this is limited by the damage threshold of the laser, but even so could give a 3 dB signal-to-noise ratio increase, or a range increase factor of 1.4. Clearly, the use of an external modulator would permit a higher RF power level to be transmitted.

Optical Amplification

The limiting factor here is saturation of the electro-absorption modulator. Also, optical amplification, achieved through the use of a fibre amplifier or a semi-conductor amplifier, would add complexity. Nevertheless, if used, one could expect a 6 dB increase in signal-to-noise ratio, which equates to a range increase factor of 2.

EXAMPLE

An erbium-doped optical fibre amplifier was used at the head end to boost the launched optical signal level on the downlink to 15 mW. With this power level an experiment was conducted on outdoor propagation. The same antennas and remote terminal were used. The results are shown in FIG. 18. As can be seen, the furthest separation used was 75 meters, at which the power level at the remote terminal was −78 dBm.

Higher Antenna Gain at the Electro-Absorption Modulator

Here the question is how does one want to trade directionality for gain. Obviously it is possible to use a highly directional antenna, for example antennas with gains of 18 dB are available, but they are typically very bulky and have very narrow beam widths. In experiments to date we have used an antenna which is no larger than a packet of cigarettes, which has an 8 dB gain and a 70° beam width. One could, at the price of extreme directionality, get a 10 dB increase in signal-to-noise ratio, that is a range increase factor of 3.2.

UPLINK

More Efficient Photo-Detector

By using a more efficient photo-detector one could obtain a 6 dB increase in signal-to-noise ratio which is a range increase factor of 2.

Higher Optical Power

As indicated above, by using a more efficient laser or an external modulator or optical amplification one could increase the optical power on the downlink and hence on the uplink, but this is limited by the saturation threshold of the electro-absorption modulator. Nevertheless, one could obtain an effective 6 dB increase in signal-to-noise ratio, a range increase factor of 2.

Optical Pre-Amplification

The limiting factor here would be saturation of the photodiode. Obviously complexity would be increased but this could be minimised, for example by using an optical detector of the type described in our U.S. Pat. No. 5,446,751. Alternatively, an optical amplifier, either fibre or a semiconductor laser amplifier, could be included in the uplink path. This could give a 10 dB increase in signal-to-noise ratio, or a range increase factor of 3.2.

RF Pre-Amplification

In fact the RF system in the BreezeNet is highly optimised. There is thus little scope for improvement. Any improvement would come at the cost of potentially significant extra complexity. The limit on maximum allowed radiated power may also be significant here.

High Antenna Gain at the Station Adapter

Again, this is a trade off between directionality and gain, in addition, the limits on the maximum allowed radiated power are relevant here. Probably no increase can be obtained.

It can be seen that although some of these options are simple to implement, they give substantial improvement to the radio range of the system. A radio range of between 1 and 200 meters should be possible therefore without resorting to expensive or impractical measures.

Improved performance in the systems depicted in FIGS. 1 and 2 may be achieved if the transmitter 1 comprises two lasers, laser 1 and laser 2, emitting light at different wavelengths$\lambda_1$ and $\lambda_2$ respectively, where $\lambda_1 < \lambda_2$ (e.g. $\lambda_1 = 3\mu$ and $\lambda_2 = 1.55\mu$). The idea being that light from laser 1 is used to carry the downlink signal, while light from laser 2 is used to carry the uplink signal. Light from laser 1 is modulated at the transmitter 1 and is detected at the modulator 4. $\lambda_1$ can be chosen to be suffuciently short that only a negligible amount of light at this wavelegth emerges from the optical output port of the modulator even when the modulator is unbiased. This leads to an improved downlink RF insertion loss at low reverse bias voltages (including the unbiased case) over that shown in FIG. 5. Light from laser 2 is not modulated at the transmitter 2. It is modulated at the modulator 4 and the uplink signal is detected at the receiver 8. Wavelegth $\lambda_2$ can be chosen so as to maximize both the downlink RF insertion loss and the uplink carrier to intermodulation ratio.

Uplink-downlink mixing can arise in the modulator in a full duplex system owing to the simultaneous presence of electrical signals correponding to the uplink and downlink signals as these signals are frequency duplexed, uplink-downlink mixing can only arise through non-linearites in the modulator's modulation versus voltage and detection versus voltage charateristics. At the modulator, the downlink electrical signal is typically several tens of dBs weaker than the applied uplink electrical signal. Consequently, uplink-downlink mixing is a more serious problem in the downlink than in the uplink. Wavelegth $\lambda_1$ may be chosen such that the variation of photodetection responsivity at $\lambda_1$ with voltage in the modulator is minimal. Therefore, the downlink signas will suffer minimal distortion due to the applied uplink signal. The two wavelength approach should thus reduce uplink-downlink mixing in the downlink. While this approach has been described with reference only to the early Figures of this application, those skilled in the art will realise that it can be appiled to most of the embodiments/applications of the present invention.

For many situations capacity on the downlink is much more important than capacity on the uplink, e.g. for remote video access or other multimedia applications. Conversely, there are other applications, for example like remote video surveillance, where only a small downlink capacity is required, but a significant uplink capacity is important. The precise nature of the application may therefore determine the choices made from the above list of options.

Additionally, the terminal of the present invention can be used in communication networks in a further configuration. FIG. 2 shows the electrical contacts 5 connected to an electrical output interface 10 and an electrical input interface 11 via bandpass filters 9a and 9b. The bandpass filters are chosen such that electrical data signal 25 is present at the electrical output interface 10 substantially free from inter-mixing with electrical data signal 26 and that electrical data signal 26 is present at the electrical output interface 11 substantially free from inter-mixing with electrical data signal 25. For example, in a cable television distribution network wherein a plurality of television signals are transmitted downstream within the frequency range 10 MHz to 600 MHz and control signals are transmitted upstream within the frequency range 100–200 kHz, the bandpass filter 9a will reject substantially all signals below 10 MHz or above 600 MHz whilst allowing substantially all signals within the range 10 MHz to 600 MHz. Similarly, the bandpass filter 9b will reject substantially all signals below 100 kHz or above 200 kHz whilst allowing substantially all signals within the range 100 kHz to 200 kHz. Clearly in some situations it may be possible to dispense with the filter 9a or filter 9b, depending upon the characteristics of the communications network or equipment connected to the interfaces 10 and 11.

The electrical interfaces may be connected to a wide range of suitable equipment, including a pair of antennas, a further optical transmitter and receiver, an electrical transmitter and receiver (in order to transmit signals across a LAN in a building or a number of rooms) or customer premises equipment (CPE) such as a set-top box for broadcast cable television services or interactive multimedia services e.g. video on demand. This list is not exhaustive and should not be interpreted as a limitation to the scope of the invention. For many of these applications, such as for example set top boxes or other CPE, there will be a ready power supply and hence there may be advantage in using a powered rather than passive terminal.

Figure 6:
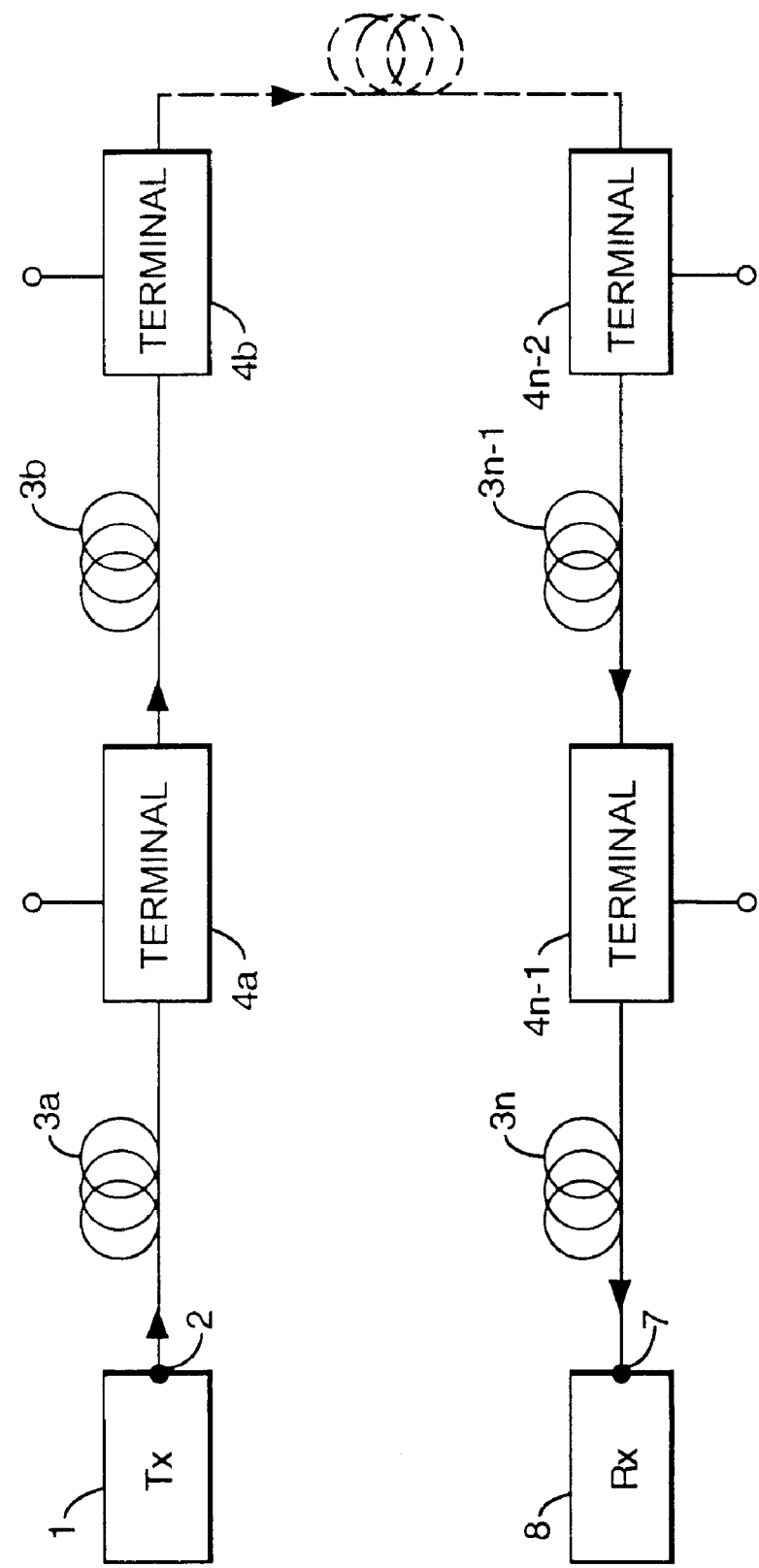
FIG. 6 is a schematic depiction of an optical communications network featuring a plurality of terminals according to the invention.

It is possible for a plurality of terminals to be connected in series, as depicted in FIG. 6.

Figure 7:
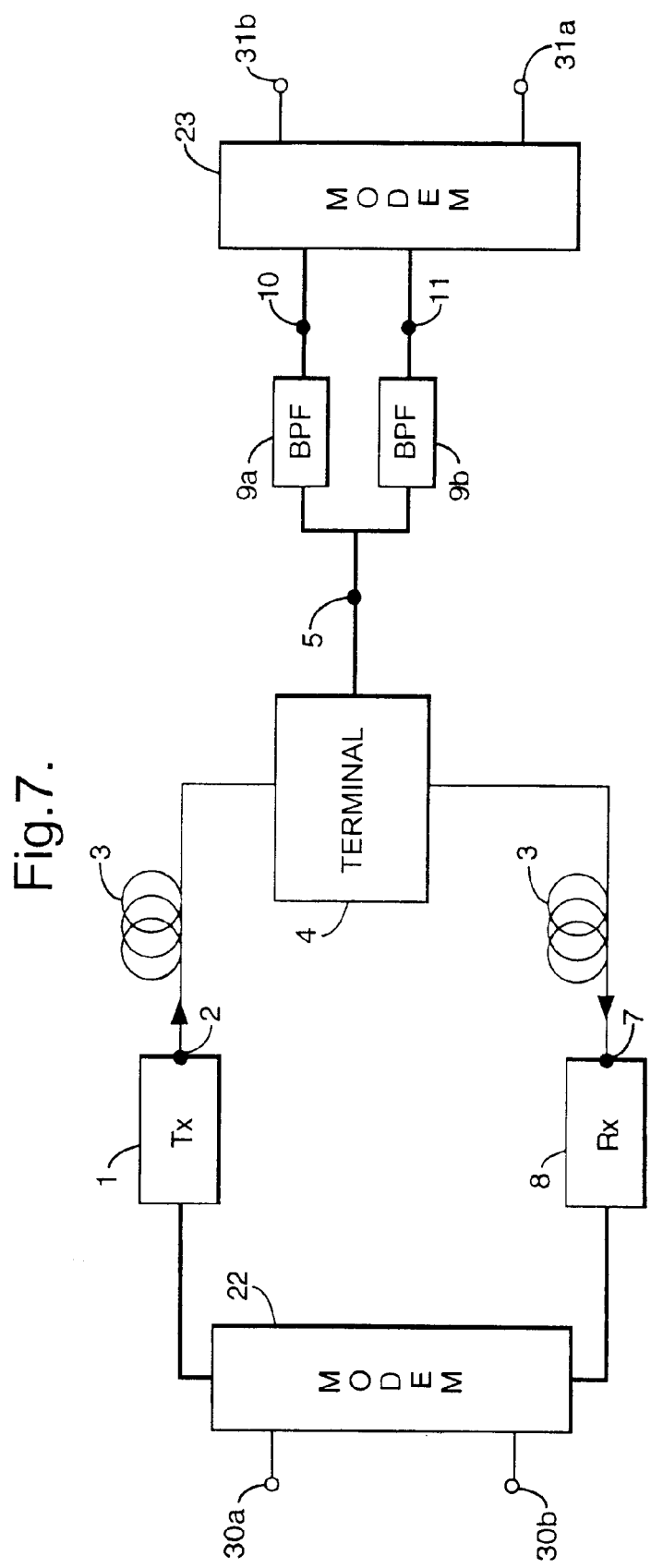
FIG. 7 is a schematic depiction of an optical communications network featuring a terminal according to the invention and two modems.

The above description has been solely concerned with analogue signals. In order to transmit digital signals it is necessary to use modems with the optical transmitter and receiver at the head-end and with the electrical interfaces at the remote terminal(s). A modem is a modulator-demodulator, which enables digital signals to be modulated as analogue signals, without loosing any significant part of the information carried by the digital signals, transmitted over an analogue communications network and then demodulated, re-constituting the original digital signal. FIG. 7 shows an optical communications network which is configured with two modems in order that digital signals may be transmitted.

An electrical digital data stream, from, for example a LAN, enters modem 22 through modem input 30a and is modulated into an analogue electrical data stream with no substantial loss of information. The analogue optical data stream 24a is transmitted along the optical fibre 3 by the optical transmitter 1, detected within the EAM generating an analogue electrical data stream 25 at the electrical contacts 5, which passes through bandpass filter 9a to the electrical output interface 10 and thence to the modem 23 where the analogue electrical data stream is demodulated in order to substantially recreate the original digital data stream. The substantially recreated digital data stream is then output via modem output 31b to, for example, a second LAN.

A digital data stream from the second LAN that enters modem 23 through modem input 31a is modulated into an analogue electrical data stream 26 with no substantial loss of information which then passes, via the electrical input interface 11 and bandpass filter 9b, to the electrical contacts 5. Incoming optical carrier 24a is then modulated by the EAM to create analogue optical data stream 27a, which is transmitted along the optical fibre 3 to the optical receiver 8. The analogue optical data stream is converted into the electrical domain and fed to modem 22, which demodulates the signal in order to substantially recreate the digital data stream from the second LAN, which is then outputted via modem output 30b. Again, under certain circumstances, one or both of the bandpass filters 9a, 9b may be omitted.

The frequency at which analogue data signals can be modulated is limited by the lower value of the laser modulation bandwidth or the modulation or detection bandwidth of the EAM. In the example discussed above the modulation bandwidth of the laser was ≈6 GHz and the detection and modulation bandwidth of the EAM was ≈14 GHz, so in this case the maximum transmission performance of the network is limited by the modulation bandwidth of the laser. If modems are used in order to transmit digital signals then the modulation speed of the modem will be the limiting factor for the system, unless it is greater than the lowest modulation speed of either the laser or the modulator.

The maximum distance over which optical signals can be transmitted and detected is limited by the attenuation of the signals by the optical fibre. For the DFB laser described above, with an output power of 4 mW, the maximum distance between the optical transmitter 1 and the optical receiver 8 was found to be approximately 50 kilometres. Thus if the above laser were to be used in a simple network, such as those in FIGS. 1 and 2, the remote terminal could be sited approximately 25 kilometres from the base station. This maximum transmission distance could be extended with the use of optical amplifiers, either fibre or semiconductor, to increase the level of the optical signal. The use of a higher power source would obviously also increase the maximum transmission distance and hence range.

A further example, which makes use of various of the alternatives set out above, will now be described.

EXAMPLE 2

Figure 9:
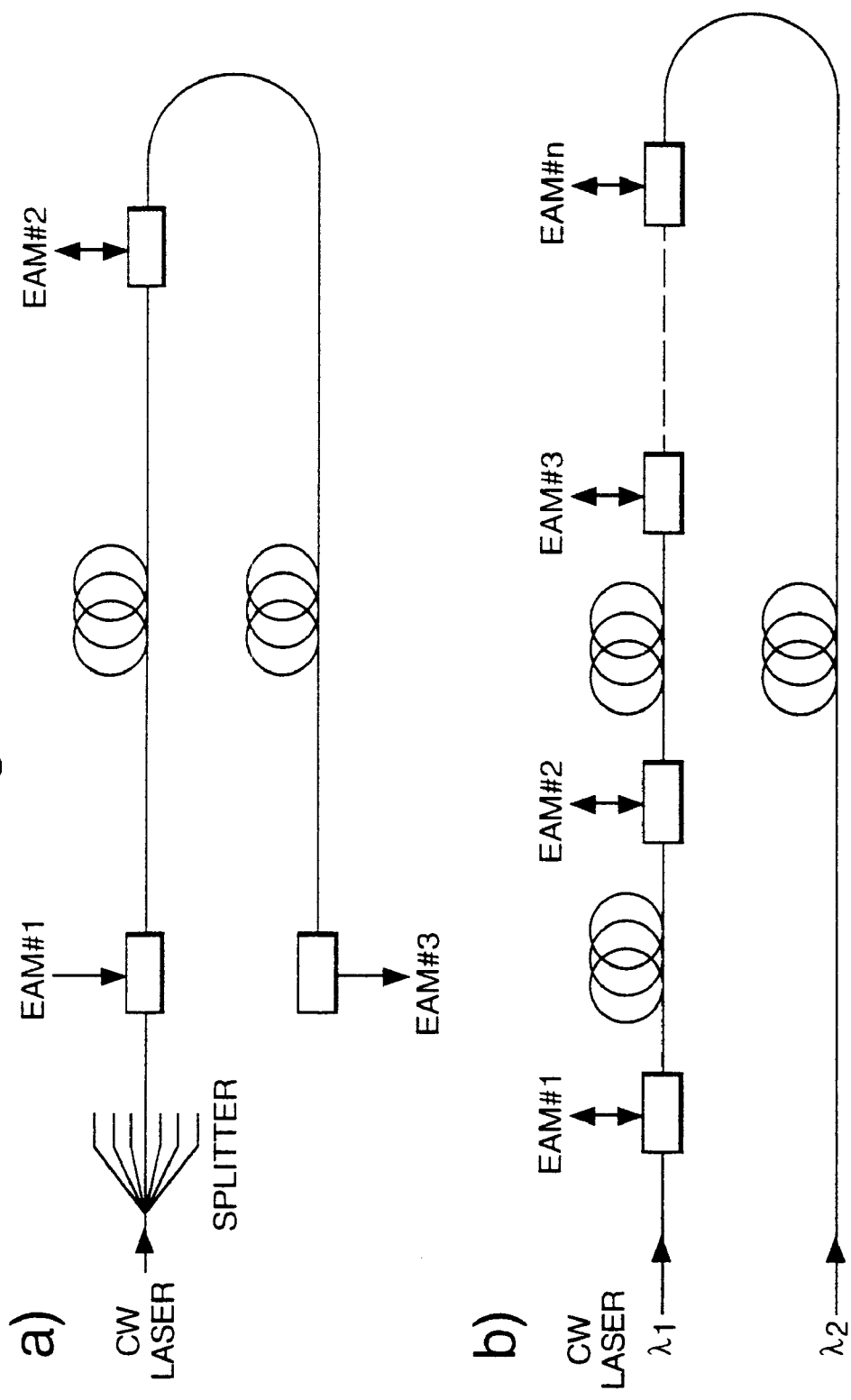
FIG. 9 shows schematically two network configurations using EA modulators at network nodes.

The experimental optical configuration is shown in FIG. 8. A single, low insertion-loss, EA modulator module is used at the remote terminal. A practical low cost/low power system would most likely use EA modulators at each terminal—thereby eliminating entirely the need for analogue laser transmitters. FIG. 9 shows two possible network configurations which use only EA modulator transceivers. In FIG. 9a, several point-to-point links share a common CW laser optical (high) power source. In each link, a remote transceiver, EAM#2, is connected to a transmitter, EAM#1, and receiver, EAM#3. In FIG. 9b, a number of EA transceivers share an optical bus powered at the ends by two CW lasers (i.e. all transceivers share the same RF spectrum).

In our experiment, a 120 MB/s QPSK modem signal, up-converted to 1.347 GHz, is combined with the down-converted TV channels from one polarisation of the Astra (TM) group of satellites. The combined signal is then applied to a commercial analogue DFB laser module, which emits an optical power of +6 dBm at $\lambda=1.56$ μm. After transmission over 25 km of step-index fibre, the optical signal is detected in the remote EA modulator transceiver. A further 120 MB/s modem signal, centred at 140 MHz, is applied to the modulator via a duplexer/multiplexer and impressed on the optical signal for the return path to a commercial photodetector receiver module. The RF multiplexers used to isolate the two paths were fabricated from complimentary bandpass/bandstop microstrip filters of the type described by Wenzel (in IEEE Trans. Microw Theory & Tech., 1968, MTT-16, 147–157) together with 5th order complimentary lowpass/highpass lumped filters (see Mathei. G. L, et al, "Microwave filters, impedance matching networks and coupling structures", McGraw Hill, 1964) giving >80 dB rejection of the uplink signal in the downlink path.

The modulator bias was set initially for minimum 3rd order intermodulation in the uplink ($V_b$=0.98V). At this bias, the electrical insertion loss, excluding fibre loss, was $loss_{downlink}$=43 dB and $loss_{uplink}$=41 dB and the DC electrical power consumption was <1 mW. Whereas the downlink RF insertion loss varies as the square of the one-way optical loss, the uplink RF loss varies as the one-way optical loss to the fourth power. Consequently, it is the uplink which defines the maximum link length/insertion loss.

Bit error ratio (BER) measurements were performed initially on the two data streams without the video signals present, using two methods: In the first method, the optical insertion loss was varied using an optical attenuator at point A in FIG. 8. Electrical gain was then adjusted to maintain a constant input signal to the modem demodulator. In the second method, optical insertion loss was kept constant and a variable noise source was inserted before the demodulator to stimulate different bit energy/noise ratio.

Figure 10:
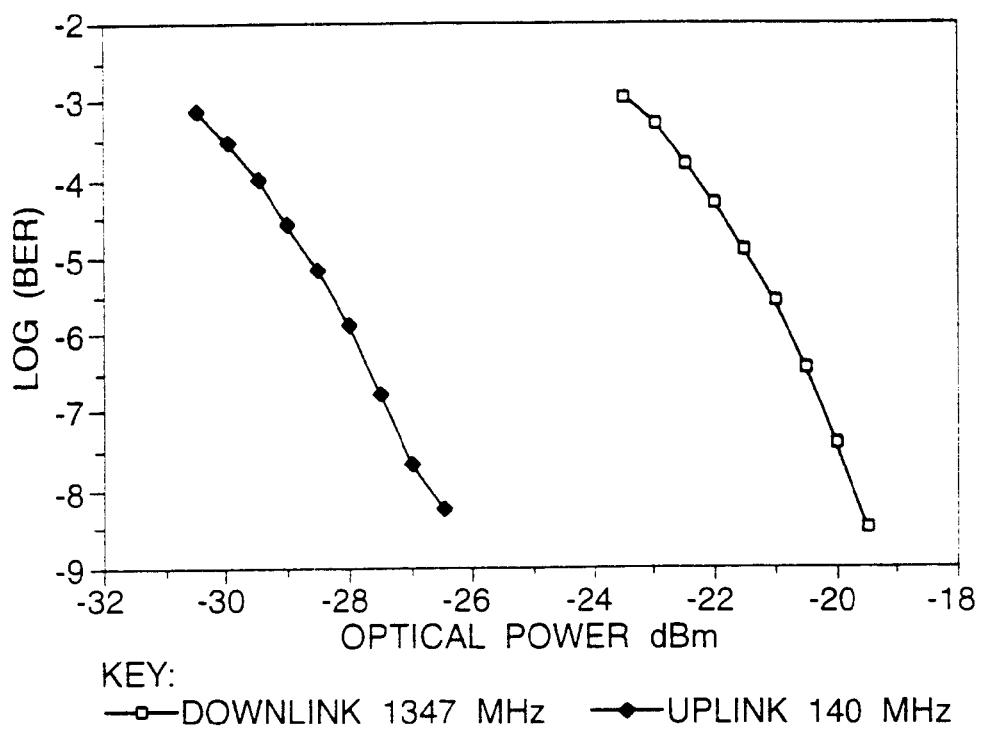
FIG. 10 shows the uplink and downlink bit error rates (BER) versus received optical power for the system of FIG. 8.
Figure 11:
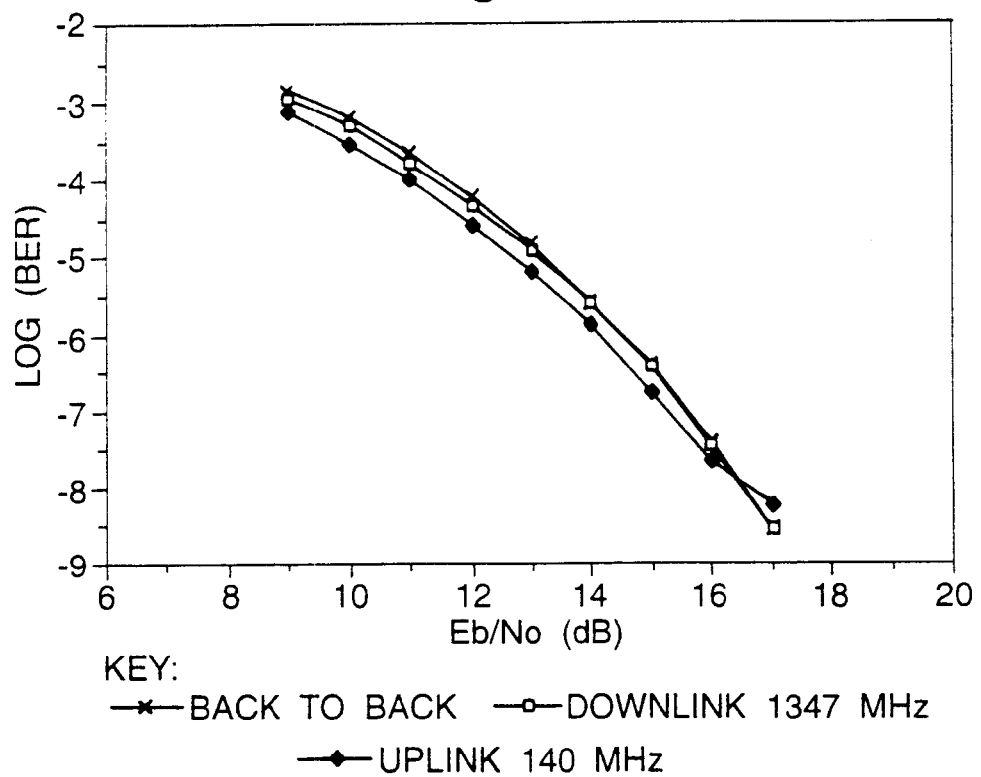
FIG. 11 shows BER against Eb/No for the system of FIG. 8.

FIG. 10 shows measured BER for both links plotted as functions of received optical power, with RF input levels of 0 dBm. The minimum received power for a BER of $10^{-8}$ in the uplink is −27 dBm for this modulation depth and it can be seen that the sensitivities for the two links differ by 7.4 dB, the uplink being more sensitive (but suffering twice the effects of fibre attenuation). It may be shown that this difference is equal to the optical insertion loss of the EA modulator plus half the difference in the (zero fibre length) RF insertion losses. BER against $E_b/N_o$ is plotted in FIG. 11, together with the back-to-back (electrical) measurement for the modem. These curves clearly demonstrate that there is no power penalty associated with the use of an analogue EA transceiver for this configuration (the uplink shows a small improvement).

Figure 12:
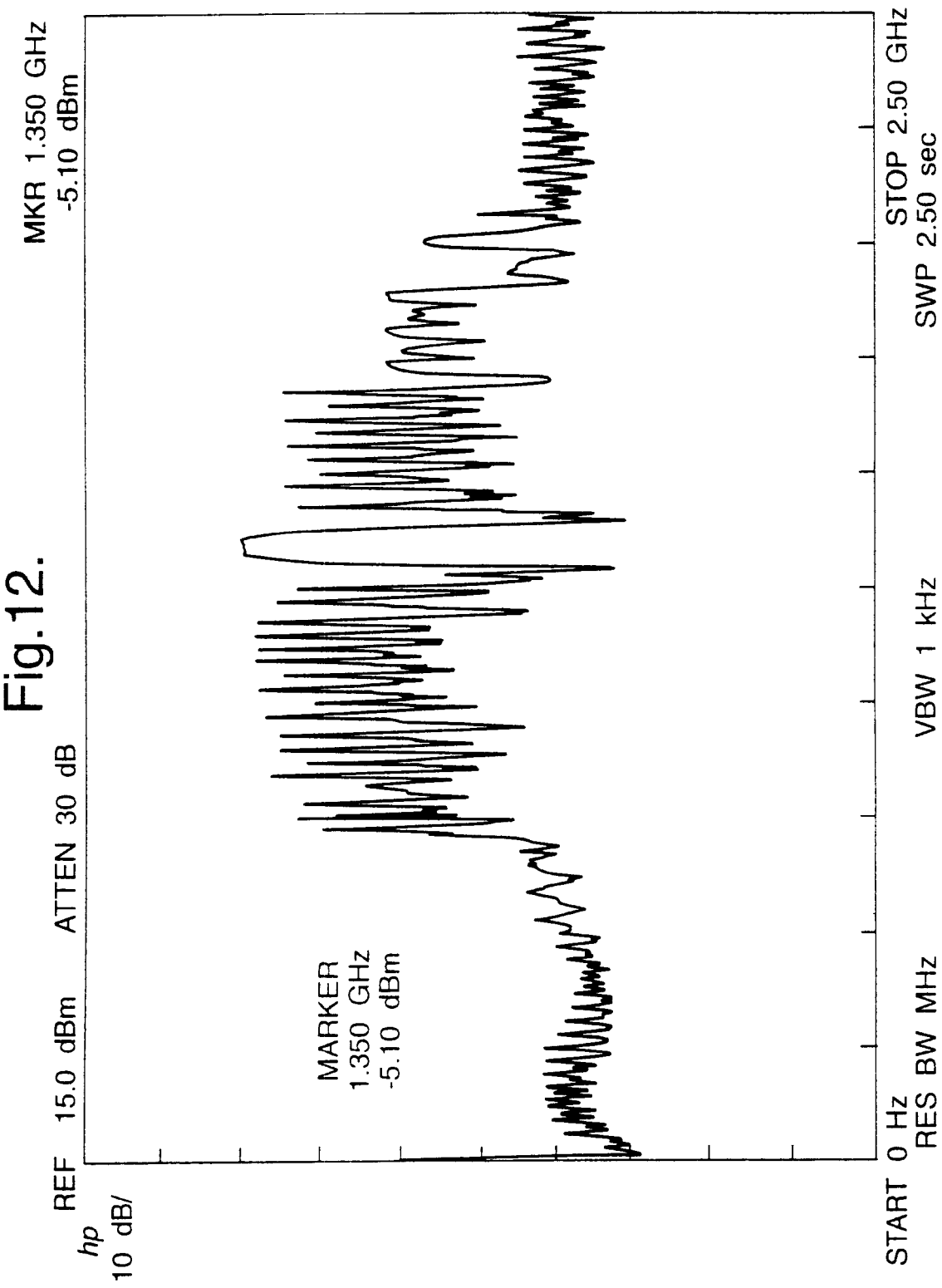
FIG. 12 shows the RF spectra of the downlink commposite signal, comprising QPSK data and satellite TV signals, for the FIG. 8 system.

Finally, BER measurements were made of the QPSK signals with the Astra FM TV signals present. The composite RF spectrum applied to the laser transmitter is shown in FIG. 12. The modem QPSK signal is evident at 1.347 GHz. Also noticeable are the digital TV channels in the Astra signal between 1.75 GHz and 2 GHz. The electroabsorption modulator bias voltage was increased to −3.65V and the QPSK signal reduced to −5 dBm in order to ensure minimum interference between the various signals. Even with this reduced RF power level, a BER<$10^{-10}$ was achieved in both links over 25 km, with no significant visible degradation to the TV signals.

EXAMPLE 3

In Example 2 we showed how a single electroabsorption modulator (EAM) can be used in a "star" type of network architecture as a low cost device to deliver high data rate channels together with multi-channel FM and digital TV. In this example, we present the use of EA modulators for single fibre, bidirectional optical bus topology operation, delivering 120 Mb/s QPSK channels. The optical bus is powered by two CW lasers, thereby avoiding the use of expensive high speed lasers. Potentially, the cost of the CW laser sources would be shared among users located at the access nodes. Furthermore, since all nodes are connected in series, the bus has to afford a certain degree of resilience. The EAM is an ideal candidate for this application: a power failure at one node (Bbias=0 volt), would leave the EAM to operate in a virtually transparent optical state, therefore leaving the rest of the network in tact.

Figure 13:
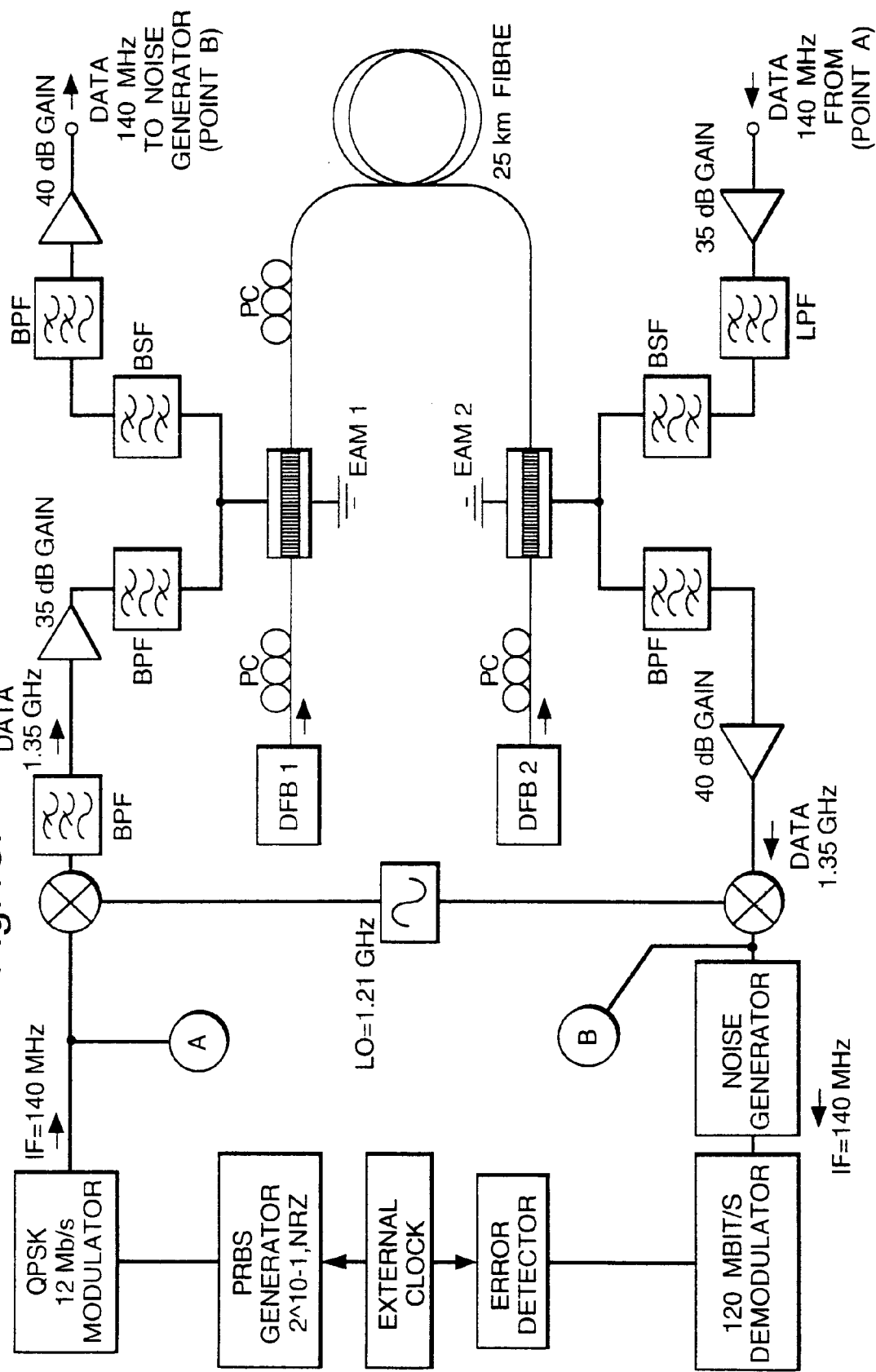
FIG. 13 shows schematically an experimental system in which EA modulators are used in a single fibre, bidirectional optical bus dleivering 120 Mbit/s QPSK channels.

Experiment: FIG. 13 shows the experimental setup. Two EA modulators (EAM1 and EAM2) were used as transceivers to share a common optical bus powered at the ends by two CW optical sources (DFB 1 and DFB 2). The launched optical powers were +6 dBm ($\lambda 1$=1560 nm) and +4 dBm ($\lambda 2$=1550 nm) respectively at EAM1 and EAM2 input ports. Polarisation controllers (PC no. 1,2,3) were tuned so as to ensure TM mode operation of both EA modulators.

For the data path, two 120 Mb/s QPSK data channels were used: the first modem signal was up-converted to a centre frequency of 1.347 GHz (channel 1), and a further modem signal was centred at 140 MHz (channel 2). EAM1 modulated $\lambda 1$ with channel 1 (−3 dBm RF drive power) and detected simultaneously channel 2 from EAM2 at $\lambda 2$. After transmission over 25 km step index fibre, simultaneous detection of channel at $\lambda 1$ and modulation of channel 2 (−3 dBm input RF power) at $\lambda 2$ is performed by EAM2 via a duplexer/multiplexer. The RF multiplexers are identical to those described in Example 2, providing >80 dB rejection between channel 1 and channel 2 at each node.

To ensure minimum distortion of the received QPSK signals, the modulator biases were set to Vb1=−2.14V and Vb2=−3.68V respectively for EAM1 and EAM2. At these biases, the optical insertion loss is 12 dB and 10 dB for EAM 1 and EAM2 respectively. The electrical insertion loss, excluding fibre loss, was 42 dB for the link EAM1 to EAM2, and 44 dB in the opposite direction. The DC electrical power consumption of the EAMs was less than 1 mW. At each access node, the electrical amplification was adjusted so as to maintain a constant signal level into the modem demodulator (−35 dBm). Finally, a noise and interference test set was used to perform BER measurements versus Eb/No (bit energy/noise ratio).

Figure 14:
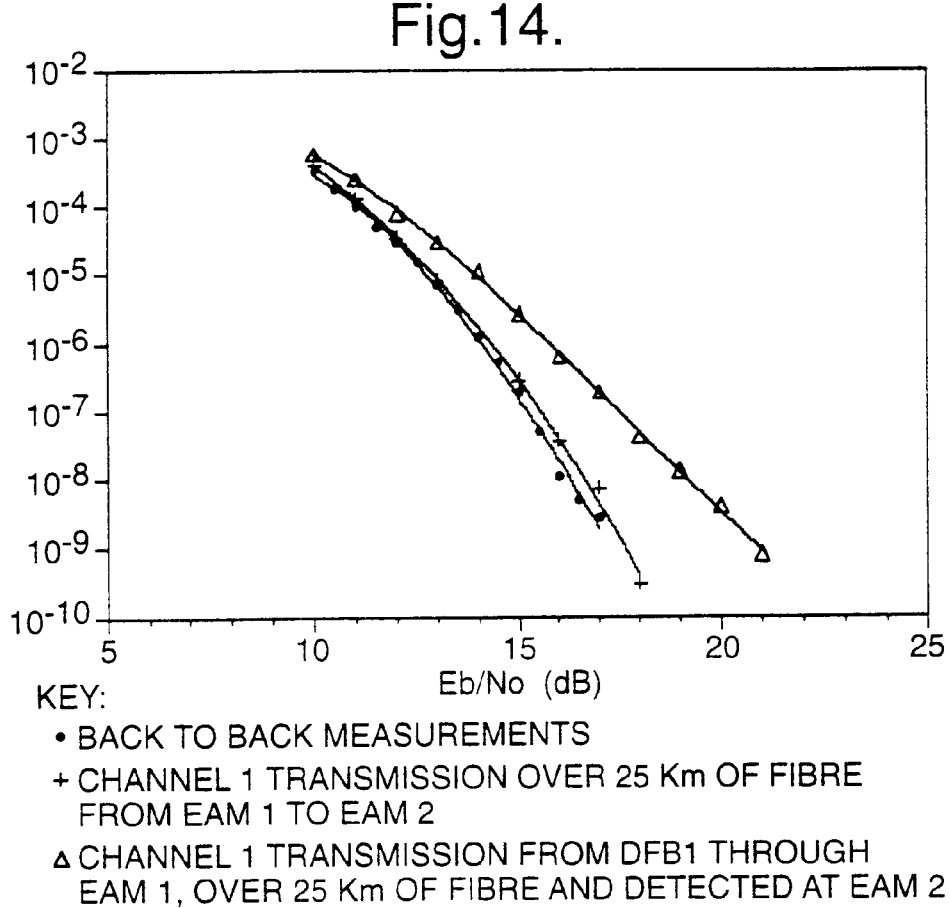
FIG. 14 shows BER against Eb/No for the FIG. 13 system.
Figure 16:
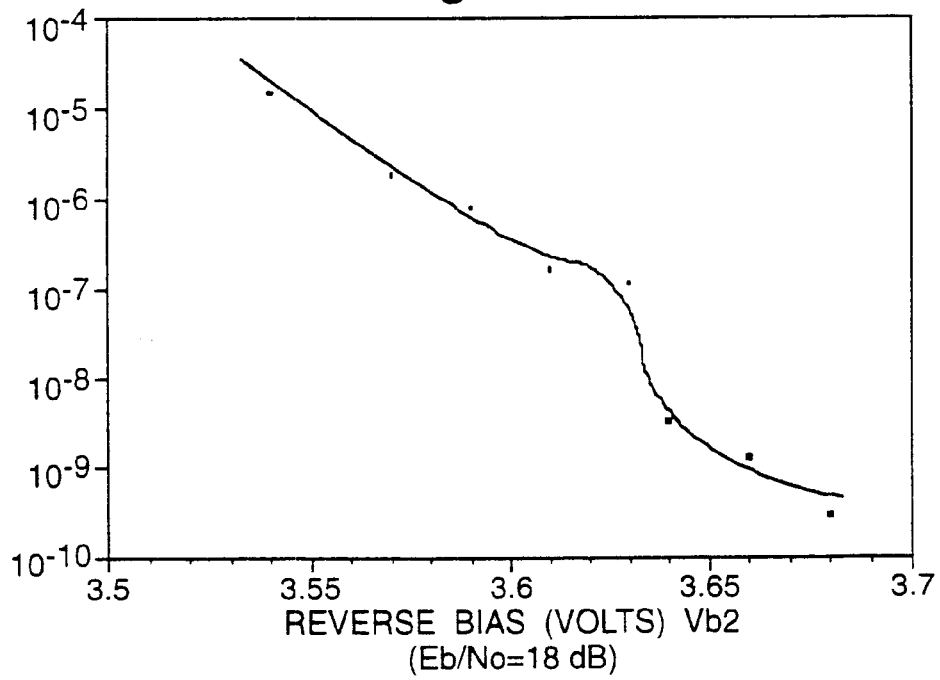
FIG. 16 shows BER against the reverse bias of EAM2.

Results and discussion: FIG. 14 shows the measured BER curves. The back to back measurement was performed using the output of the first up-converter at 1.34 GHz back to the down-converter (dots). Error free transmission was observed on this link. However, for reverse biases less than −3.68V on EAM2, a power penalty can be observed. In FIG. 16, we plot the measured BER at EAM2 output (channel 1) versus Vb2 for a given Eb/No ratio (Eb/No was maintained at 18 dB). In both curves, there is a sudden break point which occurs at Vbp=−3.68V. For |Vb2|<|Vbp|, the responsivity gradient of the DC characteristics is higher than for |Vb2|>|Vbp| and the measured BER is suddenly significantly degraded. Further evidence of the signal degradation is shown in FIG. 16 which shows the RF spectra obtained at EAM2 output on channel 1 for two sets of biases.

For Vb2>−3.64V, distortion can be observed on the received signal. We believe this distortion is due to the cumulation of two effects: the presence of the 8th and 9th harmonics of channel 2 generated by the sudden gradiant non-linearity, and the presence of a counter propagating optical signal which result in an increase of EAM2 photocurrent. This was confirmed as, when either DFB2 or channel 2 were turned off, the observed RF spectra changed from FIG. 15a to FIG. 15b.

Finally, to further characterise EA modulators concatenation in a bus architecture, we changed the setup so that we could investigate the alteration of a data stream travelling through an EA modulator. In the new setup, EAM 1 was used to modulate channel 2 only. Both channels were then recovered at EAM2 after transmission over 25 km of fibre, using the same RF multiplexers, the same optical laser sources, and keeping the biases constant. Error free performance was achieved as shown in FIG. 16. However, there is a 2 dB penalty which is believed to be due to optical harmonics generated at EAM1 and transported over the fibre.

Bus optimisation: We expect this penalty to disappear with further optimisation of the system. For instance, the choice of a higher carrier frequency for channel 2 would have been more suitabe for this application (1.1 GHz rather that 140 Mhz). Also, bias optimisation of Vb1 would have helped reducing this penalty. There is however a limit on bias tuning which results from the compromise between good photodetection and high modulation efficiency of the EA modulator.

As those skilled in the art will appreciate, the present invention is of widespread application.

Code Division Multiplexing (e.g. Code Division Duplexing), in which a different code is used for each direction of communication could usefully be used with at least the passive (and biased) picocell and microcell embodiments of this invention. CDM would also readily permit multiple base stations or remote nodes to be served by a single fibre.

Currently, EA modulators typically have fairly low saturation thresholds (or low power handling abilities). By using a (passive) splitter (eg an optical fibre coupler) to split the output from the central control station, it would be possible to share a single powerul optical source between several modulators. Clearly, the moulators could all be located close together, perhaps to cover a single microcell, or they could be grouped in clusters or spread out over a wide area. The invention Indoor Applications Offices The wireless office has long been the holy grail for data communications managers, mainly because the cost and complexity of re-cabling due to office moves can be very high. Users too appreciate the benefits of cable-free working—greater mobility and no unsightly cable spaghetti to worry about. Unfortunately, the low performance and high cost of present wireless systems have prevented their widespread use in the office although this is starting to change as the technology matures. In a few years time wireless systems based on the HIPERLAN standard (which will use transmission at 5.2 Ghz) will provide much higher data rates than present systems and it is expected that costs will be reasonably low as a result of the large market engendered by the wide acceptance of this standard. Wireless voice communications in the office is also very attractive. Cordless PBX systems based on standards such as DECT (Digitally enhanced cordless telecommunications) allow a high degree of mobility because of the built-in roaming capabilities. Cellular radio systems such as DCS1800 can also be used to provide voice communications within an office environment at charging rates close to those of a fixed line.

A true wireless office will use a combination of cellular and cordless telephony and wireless LAN systems. Each of these systems requires its own radio base unit which must be planned carefully for optimum positiona nd power. In contrast, the passive picocell system should be able to provide all of these services from a single unpowered radio base unit. Once the fibre infrastructure is in place, then the passive picocell radio base units can be connected when and where they are required. This will give an enormous advantage in terms of flexibility and ease of use. The future-proofed aspect of these radio base units is also a very powerful selling point.

Warehousing and Retailing

Wireless LAN systems are already finding a niche market for warehousing applications where the absence of trailing cables is clearly an important consideration. This is therefore an ideal application for the passive picocell, which is able to offer a future proofed service that can be integrated with any additional requirements for voice communications. In the retail sector, the flexibility offered by wireless systems is beginning to be appreciated. For example, electronic point of sale equipment can be moved around easily when the store layout changes. Again, the passive picocell is in a good position to provide this wireless connectivity within an integrated system where future proofing is perhaps the key consideration.

Airport Concourses

An airport concourse is a good example of a present day picocell—a small hotspot of high demand. The full service and future proofed capabilities of the passive picocell are again ideally suited to this application. In the near future, airport authorities are considering the use of radio tagging in an attempt to 'shepherd' travellers through airports and improve security. The 'passive picocell' may also have a role to play here, where this new radio system can be added to the others delivered by the radio base units.

One of the most attractive applications is in cellular radio, especially for picocellular and microcellular schemes. Conventional cellular radio base stations include tuned RF power amplifiers which restrict the wavlengths which can be handled by each base station. Allocation of new wavelengths to move capacity requires the replacement/addition of amplifiers etc., which is obviously relatively slow and expensive to achieve. In addition, such base stations have fairly significant power consumption, which means that generally a mains power supply must be provided, with back-up batteries to cover power outtages. The combined effect of these limitations is that the minimum volume and weight for such base stations are relatively high—severely limiting the sites at which base stations can be placed.

Although known radio-by-fibre alternatives to this conventional approach potentially overcome the fixed wavelength problem and significantly lower the minimum volume and weight required for a base station, there is still the problem of providing a power supply and back-up batteries.

The invention enables base station power consumption to be reduced considerably and in many cases eliminated completely. Thus, it becomes possible to reduce still further the minimum size and volume required for a base station. With the consequent greater freedom to site base stations, new architectures become possible. It becomes more interesting to consider capacity on demand architectures—where capacity is switched, by the central office, around between passive base stations according to the actual or expected level of demand.

Railway stations can be provided with extra capacity during peak periods, which capacity can then be switched to commercial or business districts for the main working hours. Sports stadia or other entertainment facilities can be provided with capacity as and when needed. The sports stadium is a good example of an outdoor application requiring high capacity. It is also a good example to illustrate the concept of dynamic capacity allocation, or capacity on demand, which is made possible by the passive picocell system. A typical sports stadium is used for major events for a few percent of the time at most. Conventional systems would need to provide fully equipped base stations to cater for peak demand which ties up valuable resources. The passive picocell system is capable of switching capacity to where it is needed on a dynamic basis. So when the football game is on, the passive picocell base units are connected to sufficient network capacity to cater for the half-time peak demand, and when the ground stands empty, the same network capacity can be used for other locations.

This capacity on demand concept can be used on a larger scale, for example in and around a major city. During the day, the capacity could be diverted into the city and in the evening the same capacity could be sperad across the suburbs—in other words the capacity can follow the people. This type of scheme can uniquely meet the demands of high localised capacity at an economical cost. Even with the distribution range of the various non-optimised examples, it becomes possible to switch capacity between quite widely distributed sites. Again, the use of optical amplification, particularly in the return path from the base station (to avoid saturation of the modulator) is an easy way to extend the range of these systems without the need to move away from the passive base station approach. In these applications the expensive, bulky and relatively sensitive RF equipment can be sited at a central office in a benign environment.

Figure 19:
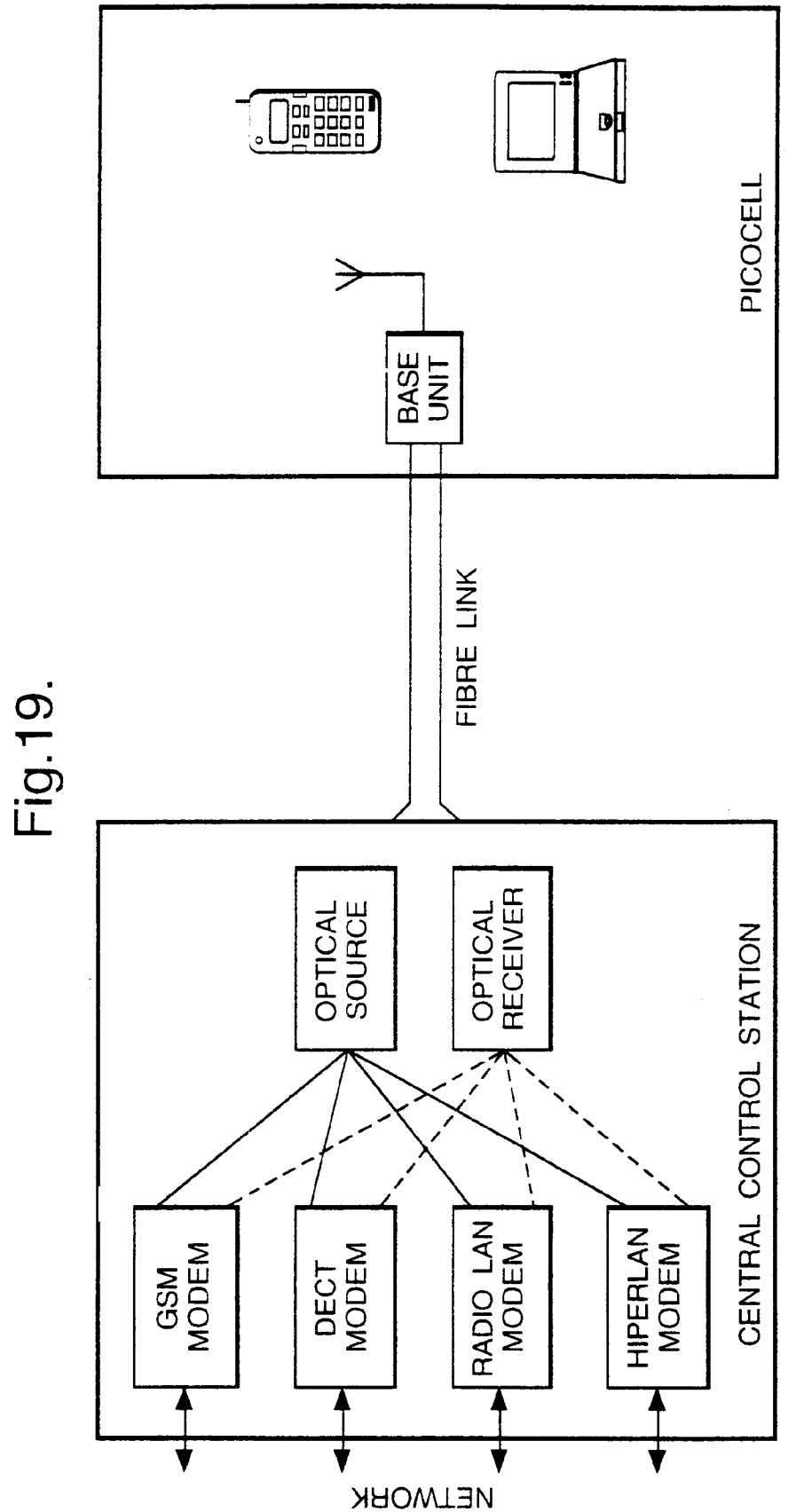
FIG. 19 shows schematically the central control office and a picocell of a picocell installation.

In addition, the invention permits a single base station to serve several systems (GSM, DECT, etc). Using FDM, it is possible to use one base station to serve, for example a combination of GSM, which uses frequencies around 900 mhz, DECT, which operates around 1900 Mhz and current radio LAN systems operating around 2.5 Ghz. If all three signals are combined, carried optically over fibre to the base station and radiated from there over free space, only a GSM handset will respond to the GSM signals since the antenna and input stages are highly frequency selective and will therefore reject the DECT and radio LAN signals. Similarly, the relevant receivers for the radio LAN and for DECT will respond only to their signals. The cental control station contains the radio modems connected to their respective networks. These modems provide the radio signals transmitted to the radio base units. Each radio modem is associated with a particular system, for example, GSM, DECT,or radio LAN and their signals are combined for onward transmission. This is shown schematically in FIG. 19. The central control station on the left of the Figure shows a variety of radio modems and includes ones for emerging standars. The picocell, which could be an office or a street or airport terminal , shows a range of terminals all of which should be able to operat simultaneously without inter-system interference.

Outdoor Applications
Fixed Radio Access

Fixed radio access, also known as wireless local loop, is seen as an economical way of providing service, especially for other licensed operators trying to take market share from an incumbent operator. From a BT perspective, this is an attractive option for joint venture companies. The passive picocell system could be used in this type of application as long as the range was not too great. An architecture whereby fibre extends to the radio distribution point (DP) would see radio base units mounted on street poles with a range of up to 200 m, the range predicted for the passive picocell with further optimisation. This arrangement would remove the need for dropwires into customers' premises, and would also avoid problems caused by using active electronics in hostile environments. These radio DPs could also act as base stations for cordless or cellular systems at the same time, a major bonus that could wing the economics in favour of this technique.

Fibre to the home is often referred to as the ultimate objective for a truly broadband access netowrk, and is likely to be the access medium of choice in the long term. The passive picocell has an important role to play in this architecture too. Once the fibre is installed in the home, the passive picocell base unit could be used to avoid further cabling. This is clearly a desirable objective. The base unit could be installed in the roof for example to give wireless communications throughout the home.

Microcells

Microcellular systems are being deployed at an ever-increasing rate to satisfy the capcity demand on cellular networks. These systems have a typical range of a few hundred meters and are used in dense urban environments where the base stations are below roof height. They radiate low power levels and a typical coverage area would be a city street. To avoid handover problems for fast moving mobiles, they will be used in a hierarchical arrangement with 'umbrella' macrocells which are designed to cover for this eventuality. The prospect of a small, lightweight, low-cost and unpowered base station is obviously attractive for this application. This is especially true since the cost of renting building space for the base site is expensive and getting more so as building owners begin to realise their value to cellular operators.

The outdoor passive picocell example had a range of 75 meters, even with a non-optimised set-up. With such a range applications to provide effective radio coverage in radio "black spots" are perfectly feasible. Passive picocell base stations can be provided at all the necessary points in a high rise office district (such as are typically found in the financial districts of major cities) or in road or rail tunnels. This approach seems particularly suitable as a means of providing localised radio coverage on the platforms of underground railway stations. Clearly for office blocks, shopping complexes and the like, the picocellular approach according to the invention is attractive.

Temperature sensitivity

Present evices are sensitive to temperature. For indoor applications this is not important, but it is a serious concern for outdoor applications. Currently preferred solutions involve the optical source, which can either be broadband (so that changes to the EAM operating wavelength fall within the source bandwidth) or made to track the EAM operating wavelength using a control loop (which would be simple to implement in the looped versions of the passive picocell.

In place of the EAM, it would be possible to use an asymmetric Fabry Perot modulator (for example one made from indium phosphide or the like). In this case, modulation is achieved by tuning the modulator (typically by varying the refractive index of the material within the FP cavity) between a resonance peak and off-peak. Such a device, whose asymmetry is due to its two reflectors having different reflectivities, would be used in reflection.

As indicated at the start of this specification, the invention in various aspects is applicable to radio and microwave systems having frequencies in the hundreds of MHz to millimetre wave bands. For example the invention is applicable to the HIPERLAN standard which will use 5.5 Ghz, as well as to 60 Ghz raio LANs (e.g. 120 Mbit/s). The invention can equally be applied to phased array and other radars, for example to feed antennas on military and other aircraft. In addition, as will be clear from the above description, the invention in some aspects is applicable to much lower frequencies, e.g. baseband.

What is claimed is:

1. A terminal for use in an optical communications network, the terminal comprising; an electro-absorption modulator having an optical input port, an optical output port and electrical contacts for the application of electrical control signals at the modulator; the terminal having:
    an optical input port for connection to the optical network to receive an optical input from the network and to feed it to the input port of the modulator;
    an optical output port for connection to the optical network to pass optical signals from the output port of the modulator into the network;
    electrical input means connected to the electrical contacts of the modulator to permit the application of electrical input signals to the modulator to cause an optical input received at the input port of the modulator to be output from the output port of the modulator carrying a modulation imposed by the modulator;
    electrical output means connected to the electrical contacts of the modulator to output an electrical signal produced by the modulator as the result of the receipt by the modulator of an optical input signal at the input optical port of the modulator; and further comprising a power supply to bias the modulator at a level at which the interference between electrical input signals to the modulator and electrical signals produced by the modulator as the result of the receipt by the modulator of an optical input signal at the input optical port of the modulator is minimised.

2. A terminal as in claim 1, wherein the electrical contacts of the terminal are connected to an antenna, a further communications network, a modem or an item of customer premises equipment.

3. An optical communications network comprising a plurality of terminals, as claimed in claim 1, connected in series.

4. A terminal as claimed in claim 1, wherein the optical input port of the modulator and the optical output port of the modulator are provided by a single common port, a reflector being provided to reflect back light which has passed through the modulator.

5. A terminal as claimed in claim 4, wherein the modulator is a multiple quantum well modulator.

6. A terminal as claimed in claim 1, wherein the modulator is a multiple quantum well modulator.

7. A radio or microwave distribution point or base station comprising:
    an electro-absorption modulator having an optical input port, an optical output port and electrical contacts for the application of electrical control signals to the modulator;
    first antenna means for the reception of free space transmissions of radio frquency or microwave signals;
    second antenna means for the free space transmission of radio frequency or microwave signals;
    an optical input port for connection to an optical fibre feed to receive an optical input and to feed it to the input port of the modulator;
    an optical output port for connection to an output optical fibre to pass thereto optical signals from the output port of the modulator;
    wherein said first antenna means is operatively connected to the electrical contacts of the modulator to permit the application of radio frequency or microwave signals received by the first antenna means to the electrical contacts of the modulator to cause an optical input received at the input port of the modulator to be output from the output port of the modulator carrying a modulation imposed by the modulator; and wherein the second antenna means is operatively connected to the electrical contacts of the modulator to output a radio frequency or microwave signal produced by modulator as the result of the receipt by the modulator of an optical input signal at the optical input port of the modulator.

8. A base station as claimed in claim 7, wherein the first and second antenna means are provided by a single antenna.

9. A base station as claimed in claim 7, wherein the optical input port and optical output port of the modulator are common, the modulator being arranged to operate in a reflection mode.

10. A base station as claimed in claim 7, wherein the optical input port and optical output port of the base station are common to permit connection to a single optical fibre feed over which optical signals will, in use, pass bi-directionally.

11. A base station as claimed in claim 7, wherein the optical modulator is an electro absorption modulator.

12. A base station according to claim 7, wherein the optical input and output ports of the base station are operatively connected to optical fibre respectively to receive an optical input therefrom and to output an optical signal thereto, and wherein the optical fibre is operatively connected to a source of optical signals, the source being configured to provide optical signals, which optical signals are detectable by the modulator and include an RF or microwave component which is suitable for radiation by said second antenna means.

13. A base station as claimed in claim 12, wherein the source of optical signals provides said optical signals at a first wavelength, $\lambda 1$, and also provides an optical carrier having a wavelength $\lambda 2$ which the modulator can modulate, $\lambda 1$ being shorter than $\lambda 2$.

14. A base station as claimed in claim 12 wherein the base station provides RF or microwave signals of at least two systems.

15. A base station as claimed in claim 14, wherein the at least two systems include at least two of DECT, GSM and a radio LAN.

16. An antenna installation for a radio transmission system, the installation comprising: antenna means for transmission and reception of radio-frequency signals; optical input and optical output ports; an electro-absorption modulator arranged in the optical path between the optical input port and the output port and operatively connected to the antenna means and arranged in use to receive RF signals therefrom and to impose a corresponding modulating onto light received via said input port and which passes to said output port; and optical detection means arranged in use to receive optical signals via said input port and operatively connected to the antenna means so that RF modulation present in said optical signals is coupled out to said antenna means from which it is then radiated.

17. An installation as in claim 16, wherein the antenna means comprises a single antenna which serves for both reception and transmission.

18. An installation as claimed in claim 16, wherein the antenna means comprises at least two antennas.

19. An installation as claimed in claim 18, wherein different antennas are provided for reception and for transmission.

20. An installation as claimed in claim 16, wherein the modulator is an electro-absorption modulator.

21. An installation as claimed in claim 16, wherein the terminal is sited remotely from a base station or central office from which it receives, in use, radio frequency signals over an optical fibre linking the terminal to the base station or office, which radio frequency signals are subsequently radiated from the antenna means of the terminal.

22. A cellular radio system comprising a plurality of antenna installations as claimed in claim 16.

23. A cellular radio system comprising:
first and second plurality of base stations, at least one of the plurality of base stations includes:
an electro-absorption modulator having an optical input port, an optical output port and electrical contacts for the application of electrical control signals to the modulator;
first antenna means for the reception of free space transmissions of radio frequency or microwave signals;
second antenna means for the free space transmission of radio frequency or microwave signals;
an optical input port for connection to an optical fibre feed to receive an optical input and to feed it to the input port of the modulator;
an optical output port for connection to an output optical fibre to pass thereto optical signals from the output port of the modulator;
said first antenna means being operatively connected to the electrical contacts of the modulator to permit the application of radio frequency or microwave signals received by the first antenna means to the electrical contacts of the modulator to cause an optical input received at the input port of the modulator to be output from the output port of the modulator carrying a modulation imposed by the modulator; and
the second antenna means being operatively connected to the electrical contacts of the modulator to output a radio frequency or microwave signal produced by the modulator as the result of the receipt by the modulator of an optical input signal at the optical input port of the modulator;
the first and second plurality serving distinct geographical areas;
optical source means including an optical carrier generator and means to impose radio frequency signals onto an optical carrier;
a first group of one or more optical fibre links to supply the optical carrier and the imposed radio frequency signals to said first plurality of base stations;
a second group of one or more optical fibre links to supply the optical carrier and the imposed radio frequency signals to said second plurality of base stations; and
switching means selectively to switch said carrier between the first and second group of fibre links and hence between said first and second plurality of base stations;
wherein the optical source means is shared between the first and second plurality of base stations by switching between said first and second group of fibre links in accordance with the actual or predicted level of demand on the relevant plurality of base stations.

24. A system as claimed in claim 23, wherein the first plurality of base stations serves one or more sites or geographical areas where the relevant cellular radio traffic levels tend to be at a maximum at a first time of day, and wherein the second plurality of base stations serves one or more sites or geographical areas where the relevant cellular radio traffic levels tend to be at a maximum at a second time of day different from said first time of day.

* * * * *